US012783973B2

(12) United States Patent
Rajashekara et al.

(10) Patent No.: US 12,783,973 B2
(45) Date of Patent: Nov. 3, 2026

(54) DYNAMIC TASK GROUPING

(71) Applicant: ServiceNow, Inc., Santa Clara, CA (US)

(72) Inventors: Shilpa Shree Rajashekara, Santa Clara, CA (US); Julio Cesar Valdez, Jr., Los Angeles, CA (US); Andrew Schultz, San Diego, CA (US); Sumanjali Tirunagaru, San Diego, CA (US); Amithkumar Manoharan Chithambaram, Santa Clara, CA (US); Christopher Maloy, Payson, UT (US); Devinder Narang, Santa Clara, CA (US); Karthik Rajamani, Santa Clara, CA (US)

(73) Assignee: ServiceNow, Inc., Santa Clara, CA (US)

( * ) Notice: Subject to any disclaimer, the term of this patent is extended or adjusted under 35 U.S.C. 154(b) by 0 days.

(21) Appl. No.: 18/955,199

(22) Filed: Nov. 21, 2024

(65) Prior Publication Data

US 2026/0141319 A1 May 21, 2026

(51) Int. Cl.
*G06Q 10/0631* (2023.01)
*G06F 9/50* (2006.01)

(52) U.S. Cl.
CPC ..... *G06Q 10/06311* (2013.01); *G06F 9/5027* (2013.01); *G06F 9/5038* (2013.01); *G06F 9/505* (2013.01)

(58) Field of Classification Search
CPC ........................ G06Q 10/06; G06Q 10/06311; G06F 9/5027; G06F 9/505; G06F 9/5038
See application file for complete search history.

(56) References Cited

U.S. PATENT DOCUMENTS 4,941,084 A 7/1990 Terada et al.
5,185,860 A 2/1993 Wu
(Continued)

FOREIGN PATENT DOCUMENTS

EP 0433979 A2 6/1991
EP 1607824 A2 12/2005
(Continued)

OTHER PUBLICATIONS

A. Whitbrook, Q. Meng and P. W. H. Chung, "A novel distributed scheduling algorithm for time-critical multi-agent systems," 2015 IEEE/RSJ International Conference on Intelligent Robots and Systems (IROS), Hamburg, Germany, 2015, pp. 6451-6458.*
(Continued)

*Primary Examiner* — Timothy Padot
(74) *Attorney, Agent, or Firm* — McDonnell Boehnen Hulbert & Berghoff LLP

(57) ABSTRACT

Example implementations may involve: receiving, from a software application, a request for task grouping; obtaining, from structured data, a policy that identifies controls for the task grouping and a rule; obtaining, from the structured data, the rule, wherein the rule specifies a procedure for obtaining a plurality of tasks associated with the software application that are candidates for the task grouping; based on the rule, obtaining, from the structured data, the plurality of tasks; for each respective task of the plurality of tasks, placing the respective task within one of one or more groups such that the controls are satisfied; providing, to the software application, the one or more groups with the tasks respectively placed within each; and generating, by the software application and based on the one or more groups, a schedule for workers to perform the tasks.

19 Claims, 12 Drawing Sheets

(56) References Cited

U.S. PATENT DOCUMENTS 5,237,518 A 8/1993 Sztipanovits et al.
5,261,097 A 11/1993 Saxon
5,265,252 A 11/1993 Rawson, III et al.
5,367,685 A 11/1994 Gosling
5,390,297 A 2/1995 Barber et al.
5,442,791 A 8/1995 Wrabetz et al.
5,452,415 A 9/1995 Hotka
5,522,042 A 5/1996 Fee et al.
5,533,116 A 7/1996 Vesterinen
5,655,081 A 8/1997 Bonnell et al.
5,659,736 A 8/1997 Hasegawa et al.
5,671,412 A 9/1997 Christiano
5,696,701 A 12/1997 Burgess et al.
5,715,463 A 2/1998 Merkin
5,745,879 A 4/1998 Wyman
5,761,502 A 6/1998 Jacobs
5,764,913 A 6/1998 Jancke et al.
5,887,139 A 3/1999 Madison, Jr. et al.
5,909,217 A 6/1999 Bereiter
5,937,165 A 8/1999 Schwaller, II et al.
5,949,976 A 9/1999 Chappelle
5,978,594 A 11/1999 Bonnell et al.
6,021,437 A 2/2000 Chen et al.
6,041,347 A 3/2000 Harsham et al.
6,088,717 A 7/2000 Reed et al.
6,101,500 A 8/2000 Lau
6,128,016 A 10/2000 Coelho et al.
6,131,118 A 10/2000 Stupek, Jr. et al.
6,134,581 A 10/2000 Ismael et al.
6,138,122 A 10/2000 Smith et al.
6,148,335 A 11/2000 Haggard et al.
6,166,732 A 12/2000 Mitchell et al.
6,167,448 A 12/2000 Hemphill et al.
6,175,866 B1 1/2001 Holloway et al.
6,175,878 B1 1/2001 Seaman et al.
6,260,050 B1 7/2001 Yost et al.
6,263,457 B1 7/2001 Anderson et al.
6,272,150 B1 8/2001 Hrastar et al.
6,336,138 B1 1/2002 Caswell et al.
6,363,421 B2 3/2002 Barker et al.
6,393,386 B1 5/2002 Zager et al.
6,397,245 B1 5/2002 Johnson, II et al.
6,434,626 B1 8/2002 Prakash et al.
6,438,592 B1 8/2002 Killian
6,456,306 B1 9/2002 Chin et al.
6,466,932 B1 10/2002 Dennis et al.
6,487,590 B1 11/2002 Foley et al.
6,505,248 B1 1/2003 Casper et al.
6,526,442 B1 2/2003 Stupek, Jr. et al.
6,621,823 B1 9/2003 Mellquist et al.
6,707,795 B1 3/2004 Noorhosseini et al.
6,742,015 B1 5/2004 Bowman-Amuah
6,763,380 B1 7/2004 Mayton et al.
6,816,898 B1 11/2004 Scarpelli et al.
6,895,586 B1 5/2005 Brasher et al.
6,948,175 B1 9/2005 Fong et al.
6,985,901 B1 1/2006 Sachse et al.
7,003,564 B2 2/2006 Greuel et al.
7,028,228 B1 4/2006 Lovy et al.
7,043,537 B1 5/2006 Pratt
7,043,661 B2 5/2006 Valadarsky et al.
7,062,683 B2 6/2006 Warpenburg et al.
7,096,459 B2 8/2006 Keller et al.
7,146,574 B2 12/2006 Goldthwaite et al.
7,197,466 B1 3/2007 Peterson et al.
7,215,360 B2 5/2007 Gupta
7,216,304 B1 5/2007 Gourdol et al.
7,222,147 B1 5/2007 Black et al.
7,281,170 B2 10/2007 Taylor et al.
7,328,260 B1 2/2008 Muthiyan et al.
7,412,502 B2 8/2008 Fearn et al.
7,505,872 B2 3/2009 Keller et al.
7,593,013 B2 9/2009 Agutter et al.
7,596,716 B2 9/2009 Frost et al.
7,617,073 B2 11/2009 Trinon et al.
7,660,731 B2 2/2010 Chaddha et al.
7,676,294 B2 3/2010 Baier et al.
7,676,437 B2 3/2010 Satkunanathan et al.
7,840,490 B1 11/2010 Sellers et al.
7,877,783 B1 1/2011 Cline et al.
7,890,869 B1 2/2011 Mayer et al.
7,966,398 B2 6/2011 Wiles, Jr.
8,060,396 B1 11/2011 Bessler et al.
8,196,210 B2 6/2012 Sterin
8,321,948 B2 11/2012 Robinson et al.
8,407,669 B2 3/2013 Yee et al.
8,554,750 B2 10/2013 Rangarajan et al.
8,595,647 B2 11/2013 Sabin et al.
8,620,818 B2 12/2013 Hughes et al.
8,646,093 B2 2/2014 Myers et al.
8,674,992 B2 3/2014 Poston et al.
8,725,647 B2 5/2014 Disciascio et al.
9,053,460 B2 6/2015 Gilbert et al.
9,069,737 B1 6/2015 Kimotho et al.
9,794,334 B2 * 10/2017 Wong ..................... G06F 9/505
9,971,826 B1 5/2018 Belmar
10,673,963 B1 6/2020 Feiguine et al.
10,749,943 B1 8/2020 Feiguine et al.
10,771,344 B2 9/2020 Bitterfeld et al.
10,824,650 B2 11/2020 Bar Oz et al.
10,944,654 B2 3/2021 Rimar et al.
10,999,152 B1 5/2021 Bar Oz et al.
11,025,481 B1 6/2021 Louca et al.
11,089,115 B2 8/2021 Garty et al.
11,095,506 B1 8/2021 Erblat et al.
11,275,580 B2 3/2022 Tamir et al.
11,277,475 B1 3/2022 Tal et al.
11,281,442 B1 3/2022 Tal et al.
11,294,666 B1 4/2022 Look
11,296,922 B2 4/2022 Leibkowiz et al.
11,301,503 B2 4/2022 Burli
11,379,089 B2 7/2022 Goswami et al.
11,451,573 B2 9/2022 Waplington
11,470,107 B2 10/2022 Waplington
11,582,106 B2 2/2023 Hameiri et al.
11,616,690 B2 3/2023 Feiguine et al.
11,630,717 B2 4/2023 Vutukuru et al.
11,632,303 B2 4/2023 Bitterfeld et al.
11,640,369 B2 5/2023 Bhogle et al.
11,671,444 B2 6/2023 Waplington
11,695,641 B2 7/2023 Bar Oz et al.
11,829,233 B2 11/2023 Watkins et al.
11,868,593 B2 1/2024 Bradley et al.
2002/0116340 A1 8/2002 Hellberg et al.
2002/0133584 A1 9/2002 Greuel et al.
2002/0158969 A1 10/2002 Gupta
2003/0118087 A1 6/2003 Goldthwaite et al.
2003/0200293 A1 10/2003 Fearn et al.
2005/0015217 A1 1/2005 Weidl et al.
2005/0091356 A1 4/2005 Izzo
2006/0026453 A1 2/2006 Frost et al.
2006/0095461 A1 5/2006 Raymond
2006/0136922 A1 * 6/2006 Zimberg ................ G06Q 10/06
718/100
2006/0179058 A1 8/2006 Bram et al.
2006/0288053 A1 12/2006 Holt et al.
2006/0293942 A1 12/2006 Chaddha et al.
2007/0033279 A1 2/2007 Battat et al.
2007/0188494 A1 8/2007 Agutter et al.
2007/0288389 A1 12/2007 Vaughan et al.
2008/0133289 A1 6/2008 Armour et al.
2008/0148253 A1 6/2008 Badwe et al.
2008/0319779 A1 12/2008 Hughes et al.
2009/0088875 A1 4/2009 Baier et al.
2009/0150209 A1 * 6/2009 Levine ................... G06Q 10/06
705/7.13
2009/0228984 A1 9/2009 Sterin
2010/0110932 A1 5/2010 Doran et al.
2013/0283273 A1 10/2013 Miyazaki
2014/0122427 A1 5/2014 Dary
2016/0371620 A1 * 12/2016 Nascenzi ......... G06Q 10/06314
2018/0046512 A1 * 2/2018 Kang .................... G06F 9/5027
2018/0123940 A1 5/2018 Rimar et al.
2018/0260253 A1 * 9/2018 Nanda ................... G06F 9/5038

(56) References Cited

U.S. PATENT DOCUMENTS

| | | | |
|---|---|---|---|
| 2018/0322442 | A1* | 11/2018 | Gupta ............ G06Q 10/063116 |
| 2019/0073257 | A1 | 3/2019 | Dasgupta et al. |
| 2019/0104398 | A1 | 4/2019 | Owen et al. |
| 2019/0129739 | A1 | 5/2019 | Al Reza et al. |
| 2019/0149515 | A1 | 5/2019 | Sharma et al. |
| 2019/0165957 | A1 | 5/2019 | Abbott et al. |
| 2019/0342162 | A1 | 11/2019 | Bendre et al. |
| 2020/0034462 | A1 | 1/2020 | Narayanasamy et al. |
| 2020/0050689 | A1 | 2/2020 | Tal et al. |
| 2020/0204443 | A1 | 6/2020 | Bar Oz et al. |
| 2020/0301678 | A1 | 9/2020 | Burman et al. |
| 2021/0097168 | A1 | 4/2021 | Patel et al. |
| 2021/0194764 | A1 | 6/2021 | Badyan et al. |
| 2022/0303352 | A1 | 9/2022 | Herzog et al. |
| 2023/0229542 | A1 | 7/2023 | Watkins et al. |
| 2024/0095626 | A1 | 3/2024 | Candas |
| 2024/0184632 | A1 | 6/2024 | You |

FOREIGN PATENT DOCUMENTS

| | | | |
|---|---|---|---|
| KR | 20230111405 | A | 7/2023 |
| WO | 9934285 | A1 | 7/1999 |
| WO | 0052559 | A1 | 9/2000 |
| WO | 0179970 | A1 | 10/2001 |

OTHER PUBLICATIONS

G. G. Castañé et al., “Simulation-Based Optimization Tool for Field Service Planning,” 2019 Winter Simulation Conference (WSC), National Harbor, MD, USA, 2019, pp. 1684-1695.*

M. K. Mishra, P. Mohanty and G. B. Mund, “A modified grouping-based job scheduling in computational grid,” 2011 Nirma University International Conference on Engineering, Ahmedabad, India, 2011, pp. 1-6.*

ServiceNow, Xanadu Now Platform Administration, Oct. 15, 2024.

* cited by examiner

600

| LABEL | TYPE | DESCRIPTION |
| --- | --- | --- |
| ASSIGNED TO | STRING | IDENTIFIES THE WORKER OR ASSIGNMENT GROUP TO WHICH THE TASK IS ASSIGNED |
| ASSET | STRING | IDENTIFIES THE ASSETS INVOLVED IN THE TASK |
| CREATED | TIME/DATE | THE DATE AND TIME WHEN THE TASK WAS CREATED |
| DESCRIPTION | STRING | A MULTI-LINE DESCRIPTION OF THE WORK TO BE DONE |
| LOCATION / CUSTOMER | STRING | IDENTIFIES THE PHYSICAL OR VIRTUAL LOCATION AT WHICH THE TASK IS TO BE PERFORMED AND/OR THE CUSTOMER ENTITY FOR WHICH THE TASK IS TO BE PERFORMED |
| NUMBER | STRING | AN IDENTIFYING NUMBER FOR THE TASK THAT IS GENERATED WHEN THE TASK IS CREATED |
| PRIORITY | INTEGER | SPECIFIES THE PRIORITY OF A TASK BASED ON ITS IMPACT AND URGENCY |
| SHORT DESCRIPTION | STRING | A CONCISE TITLE FOR THE TASK |
| STATE | INTEGER | THE STATUS OF THE TASK, E.G., PENDING, IN PROGRESS, OR COMPLETED |
| EXECUTION TIME | INTEGER | HOW LONG THE WORKER IS EXPECTED TO SPENT ON THE TASK |
| TYPE | CLASSNAME | TYPE OF TASK, WHICH CORRESPONDS TO THE CHILD CLASS; THE SYSTEM MAY POPULATE THIS VALUE WHEN A RECORD IS CREATED IN A CHILD TABLE |
| WORK NOTES | STRING | COMMENTS MADE BY WORKERS, MANAGERS, AND/OR DISPATCHERS REGARDING ASSIGNMENT, PROCESSING, AND COMPLETION OF THE TASK |

FIG. 6

Task Grouping

700

| Task Grouping Policy Table | |
|---|---|
| Name | Text |
| Active | Boolean |
| Order | Integer |
| Task type | Table Name |
| Minimum Records | Integer |
| Maximum Records | Integer |
| Sort by | Field List |
| Duration field | Field Name |
| Maximum duration | Duration |

702

| Task Grouping Rule Table | |
|---|---|
| Name | Text |
| Active | Boolean |
| Policy | Reference (Task Grouping Policy Table) |
| Order | Integer |
| Task Filter | Conditions |
| Group by | Field List |
| Simple | Boolean |
| Advanced | Script |

704

| Task Grouping Qualifier Table | |
|---|---|
| Name | Text |
| Policy | Reference (Task Grouping Policy Table) |
| Assignment Group | Reference (Assignment Group Table) |

FIG. 7A

DYNAMIC TASK GROUPING

BACKGROUND

Enterprises can have a wide variety of tasks that are to be completed by workers. In conventional systems, these tasks are assigned to workers as the tasks are received and based on worker availability. However, this method for scheduling can result in many inefficiencies such as increased scheduling and task-switching overhead, as well as pre-task and post-task overhead. For example, if a first worker is assigned to a task at a location, the first worker might not be available to be assigned to other tasks. In this example, if the enterprise receives a second task at the same location, the enterprise might assign a second worker to complete the task. In other words, inefficient scheduling may result in multiple workers being scheduled for tasks at a same location, as opposed to a single worker being assigned to all of the tasks at the location. Such inefficiencies can be costly to enterprises and cause delays in completing tasks.

SUMMARY

Various implementations disclosed herein include techniques for grouping tasks for assignment to workers based on a number of constraints. This allows smaller tasks that are possibly similar or related to one another to be efficiently handled as a cohesive unit by a single worker (or a small number of workers). The constraints allow tasks to be grouped based on policies and rules, such as a minimum or maximum number of tasks per group, task type, degrees of commonality between the tasks, suitability of available workers for the tasks, reduction of various task overhead factors, and so on. Further, task assignment can occur by grouping only unassigned tasks, or grouping new tasks with other existing and/or assigned tasks. Such intelligent groupings reduce computational resources (e.g., processing, memory, network, and energy usage) required for task assignment and execution. Moreover, multiple task assignments can take place in parallel (e.g., for disjoint sets of tasks and workers) in order improve speed and efficiency.

A system of one or more computers can be configured to perform particular operations or actions by virtue of having software, firmware, hardware, or a combination of them installed on the system that in operation causes or cause the system to perform the actions. One or more computer programs can be configured to perform particular operations or actions by virtue of including instructions that, when executed by data processing apparatus, cause the apparatus to perform the actions. One general aspect includes a method. The method includes receiving, from a software application, a request for task grouping. The method also includes obtaining, from structured data, a policy that identifies: controls for the task grouping and a rule. The method also includes obtaining, from the structured data, the rule, where the rule specifies a procedure for obtaining a plurality of tasks associated with the software application that are candidates for the task grouping. The method also includes based on the rule, obtaining, from the structured data, the plurality of tasks. The method also includes for each respective task of the plurality of tasks, placing the respective task within one of one or more groups such that the controls are satisfied. The method also includes providing, to the software application, the one or more groups with the tasks respectively placed within each. The method also includes generating, by the software application and based on the one or more groups, a schedule for workers to perform the tasks.

Other embodiments of this aspect include corresponding computer systems, apparatus, and computer programs recorded on one or more computer storage devices, each configured to perform the actions of the methods.

These, as well as other embodiments, aspects, advantages, and alternatives, will become apparent to those of ordinary skill in the art by reading the following detailed description, with reference where appropriate to the accompanying drawings. Further, this summary and other descriptions and figures provided herein are intended to illustrate embodiments by way of example only and, as such, that numerous variations are possible. For instance, structural elements and process steps can be rearranged, combined, distributed, eliminated, or otherwise changed, while remaining within the scope of the embodiments as claimed.

BRIEF DESCRIPTION OF THE DRAWINGS

FIG. 6 depicts a schema for a task database table, in accordance with example embodiments.

FIG. 7A depicts a task grouping data model, in accordance with example embodiments.

DETAILED DESCRIPTION

Figure 1:
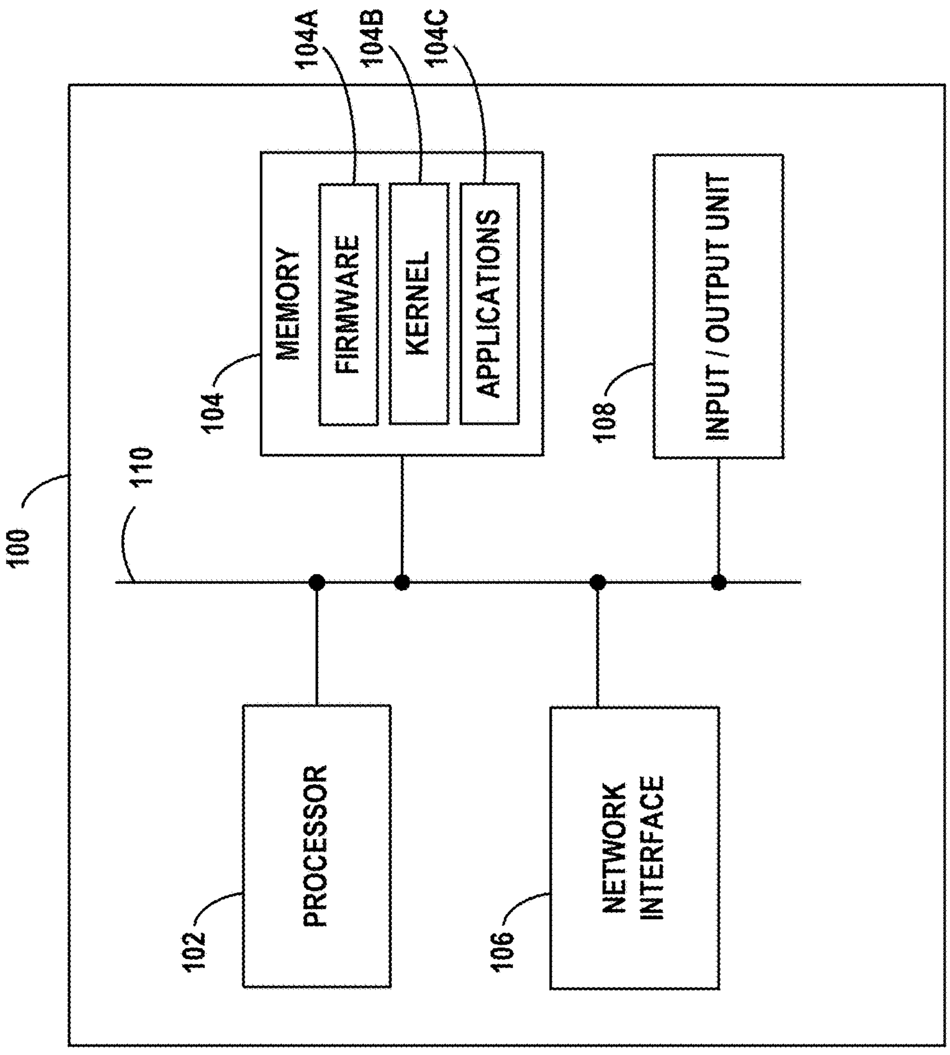
FIG. 1 illustrates a schematic drawing of a computing device, in accordance with example embodiments.

Example methods, devices, and systems are described herein. It should be understood that the words "example" and "exemplary" are used herein to mean "serving as an example, instance, or illustration." Any embodiment or feature described herein as being an "example" or "exemplary" is not necessarily to be construed as preferred or advantageous over other embodiments or features unless stated as such. Thus, other embodiments can be utilized and other changes can be made without departing from the scope of the subject matter presented herein.

Accordingly, the example embodiments described herein are not meant to be limiting. It will be readily understood that the aspects of the present disclosure, as generally described herein, and illustrated in the figures, can be arranged, substituted, combined, separated, and designed in a wide variety of different configurations. For example, the separation of software features into "client" and "server" components may occur in a number of ways.

To that point, the figures and descriptions herein that relate to data models, entity relationship diagrams, and database table structures and relationships, are provided for illustrative purposes to facilitate an understanding of the disclosed embodiments. These examples are not intended to be limiting and should not be construed as such. Various modifications, changes, and variations can be made in the structure, layout, and arrangement of the databases, tables, and relationships described, all without departing from these embodiments.

Further, unless context suggests otherwise, the features illustrated in each of the figures may be used in combination with one another. Thus, the figures should be generally viewed as component aspects of one or more overall embodiments, with the understanding that not all illustrated features are necessary for each embodiment.

Additionally, any enumeration of elements, blocks, or steps in this specification or the claims is for purposes of clarity. Thus, such enumeration should not be interpreted to require or imply that these elements, blocks, or steps adhere to a particular arrangement or are carried out in a particular order.

Unless clearly indicated otherwise herein, the term "or" is to be interpreted as the inclusive disjunction. For example, the phrase "A, B, or C" is true if any one or more of the arguments A, B, C are true, and is only false if all of A, B, and C are false.

I. Example Technical Improvements

These embodiments provide a technical solution to a technical problem. One technical problem being solved is assignment of tasks to workers in a complex system that is subject to constraints. In practice, this is problematic because as the number of tasks, workers, and constraints grows, the computational resources needed to find possible assignments of tasks to workers such that the constraints are honored scales exponentially (i.e., the technical problem is NP-hard in that there is no algorithm that can provide the optimal solution in all instances).

In other techniques, constraints are ignored, applied in an ad hoc fashion, or inefficiently (e.g., assignments take place as the tasks arrive). Thus, these techniques do not accurately solve the technical problem (e.g., multiple workers may be assigned tasks that could be more efficiently handled by a single worker) in a performative manner. Moreover, other approaches rely on subjective decisions, which leads to wildly varying outcomes from instance to instance.

The embodiments herein overcome these limitations by separating the constraints into a flexible policy framework that is independent from rules used to group tasks. Thus, rules can be applied to group tasks together for assignment to a worker based on some criteria (e.g., location, type of task, complexity, worker availability), but the constraints can be applied to the groups in order to divided these groups when they violate policies (e.g., too many tasks per group, a total task duration that is too long). In this manner, task assignment can be accomplished in a more accurate and robust fashion. This results in several advantages. First, processing resources are conserved, as processors are not tasked with attempting to solve NP-hard problems (e.g., an initial set of task groupings can be determined based on the rules, and then at least some of these groups may be divided based on the constraints). Second, memory resources are preserved by allowing sets of tasks to be subject to specific policies in a way that does not require encoding the policy into each task or the rules by which tasks are grouped. Third, once the groups are established, assignment to workers can proceed in parallel, reducing the overall time required for assignments to be completed.

Other technical improvements may also flow from these embodiments, and other technical problems may be solved. Thus, this statement of technical improvements is not limiting and instead constitutes examples of advantages that can be realized from the embodiments.

II. Introduction

A large enterprise is a complex entity with many interrelated operations. Some of these are found across the enterprise, such as human resources (HR), supply chain, information technology (IT), and finance. However, each enterprise also has its own unique operations that provide essential capabilities and/or create competitive advantages.

To support widely-implemented operations, enterprises typically use off-the-shelf software applications, such as customer relationship management (CRM), IT service management (ITSM), IT operations management (ITOM), and human capital management (HCM) packages. However, they may also need custom software applications to meet their own unique requirements. A large enterprise often has dozens or hundreds of these custom software applications. Nonetheless, the advantages provided by the embodiments herein are not limited to large enterprises and may be applicable to an enterprise, or any other type of organization, of any size.

Many such software applications are developed by individual departments within the enterprise. These range from simple spreadsheets to custom-built software tools and databases. But the proliferation of siloed custom software applications has numerous disadvantages. It negatively impacts an enterprise's ability to run and grow its operations, innovate, and meet regulatory requirements. The enterprise may find it difficult to integrate, streamline, and enhance its operations due to lack of a single system that unifies its subsystems and data.

To efficiently create custom applications, enterprises would benefit from a remotely-hosted application platform that eliminates unnecessary development complexity. The goal of such a platform would be to reduce time-consuming, repetitive application development tasks so that software engineers and individuals in other roles can focus on developing unique, high-value features.

In order to achieve this goal, the concept of Application Platform as a Service (aPaaS) has been introduced to intelligently automate workflows throughout the enterprise. An aPaaS system is hosted remotely from the enterprise, but may access data, applications, and services within the enterprise by way of secure connections. Such an aPaaS system may have a number of advantageous capabilities and characteristics. These advantages and characteristics may be able to improve the enterprise's operations and workflows for IT, HR, CRM, customer service, application development, and security. Nonetheless, the embodiments herein are not limited to enterprise applications or environments, and can be more broadly applied.

The aPaaS system may support development and execution of model-view-controller (MVC) applications. MVC applications divide their functionality into three interconnected parts (model, view, and controller) in order to isolate representations of information from the manner in which the information is presented to the user, thereby allowing for efficient code reuse and parallel development. These applications may be web-based, and offer create, read, update, and delete (CRUD) capabilities. This allows new applications to be built on a common application infrastructure. In some cases, applications structured differently than MVC, such as those using unidirectional data flow, may be employed.

The aPaaS system may support standardized application components, such as a standardized set of widgets and/or web components for graphical user interface (GUI) development. In this way, applications built using the aPaaS system have a common look and feel. Other software components and modules may be standardized as well. In some cases, this look and feel can be branded or skinned with an enterprise's custom logos and/or color schemes.

The aPaaS system may support the ability to configure the behavior of applications using metadata. This allows application behaviors to be rapidly adapted to meet specific needs. Such an approach reduces development time and increases flexibility. Further, the aPaaS system may support GUI tools that facilitate metadata creation and management, thus reducing errors in the metadata.

The aPaaS system may support clearly-defined interfaces between applications, so that software developers can avoid unwanted inter-application dependencies. Thus, the aPaaS system may implement a service layer in which persistent state information and other data are stored.

The aPaaS system may support a rich set of integration features so that the applications thereon can interact with legacy applications and third-party applications. For instance, the aPaaS system may support a custom employee-onboarding system that integrates with legacy HR, IT, and accounting systems.

The aPaaS system may support enterprise-grade security. Furthermore, since the aPaaS system may be remotely hosted, it should also utilize security procedures when it interacts with systems in the enterprise or third-party networks and services hosted outside of the enterprise. For example, the aPaaS system may be configured to share data amongst the enterprise and other parties to detect and identify common security threats.

Other features, functionality, and advantages of an aPaaS system may exist. This description is for purpose of example and is not intended to be limiting.

As an example of the aPaaS development process, a software developer may be tasked to create a new application using the aPaaS system. First, the developer may define the data model, which specifies the types of data that the application uses and the relationships therebetween. Then, via a GUI of the aPaaS system, the developer enters (e.g., uploads) the data model. The aPaaS system automatically creates all of the corresponding database tables, fields, and relationships, which can then be accessed via an object-oriented services layer.

In addition, the aPaaS system can also build a fully-functional application with client-side interfaces and server-side CRUD logic. This generated application may serve as the basis of further development for the user. Advantageously, the developer does not have to spend a large amount of time on basic application functionality. Further, since the application may be web-based, it can be accessed from any Internet-enabled client device. Alternatively or additionally, a local copy of the application may be able to be accessed, for instance, when Internet service is not available.

The aPaaS system may also support a rich set of pre-defined functionality that can be added to applications. These features include support for searching, email, templating, workflow design, reporting, analytics, social media, scripting, mobile-friendly output, and customized GUIs.

Such an aPaaS system may represent a GUI in various ways. For example, a server device of the aPaaS system may generate a representation of a GUI using a combination of HyperText Markup Language (HTML) and JAVASCRIPT®. The JAVASCRIPT® may include client-side executable code, server-side executable code, or both. The server device may transmit or otherwise provide this representation to a client device for the client device to display on a screen according to its locally-defined look and feel. Alternatively, a representation of a GUI may take other forms, such as an intermediate form (e.g., JAVA® byte-code) that a client device can use to directly generate graphical output therefrom. Other possibilities exist, including but not limited to metadata-based encodings of web components, and various uses of JAVASCRIPT® Object Notation (JSON) and/or eXtensible Markup Language (XML) to represent various aspects of a GUI.

Further, user interaction with GUI elements, such as buttons, menus, tabs, sliders, checkboxes, toggles, etc. may be referred to as "selection", "activation", or "actuation" thereof. These terms may be used regardless of whether the GUI elements are interacted with by way of keyboard, pointing device, touchscreen, or another mechanism.

An aPaaS architecture is particularly powerful when integrated with an enterprise's network and used to manage such a network. The following embodiments describe architectural and functional aspects of example aPaaS systems, as well as the features and advantages thereof.

III. Example Computing Devices and Cloud-Based Computing Environments

FIG. 1 is a simplified block diagram exemplifying a computing device 100, illustrating some of the components that could be included in a computing device arranged to operate in accordance with the embodiments herein. Computing device 100 could be a client device (e.g., a device actively operated by a user), a server device (e.g., a device that provides computational services to client devices), or some other type of computational platform. Some server devices may operate as client devices from time to time in order to perform particular operations, and some client devices may incorporate server features.

In this example, computing device 100 includes processor 102, memory 104, network interface 106, and input/output unit 108, all of which may be coupled by system bus 110 or a similar mechanism. In some embodiments, computing device 100 may include other components and/or peripheral devices (e.g., detachable storage, printers, and so on).

Processor 102 may be one or more of any type of computer processing element, such as a central processing unit (CPU), a graphical processing unit (GPU), a digital signal processor (DSP), a network processor, an encryption processor, and/or a form of integrated circuit or controller that performs processor operations. In some cases, processor 102 may be one or more single-core processors. In other cases, processor 102 may be one or more multi-core processors with multiple independent processing units. Processor 102 may also include register memory for temporarily storing instructions being executed and related data, as well as cache memory for temporarily storing recently used instructions and data.

GPUs, in particular, have grown in importance. They include specialized circuitry designed to perform rapid mathematical calculations for rendering graphics, processing large datasets, and supporting machine learning. A GPU typically consists of hundreds or thousands of small cores that operate simultaneously, facilitating the decomposition of tasks into smaller, more manageable pieces that are processed in parallel. This parallelism allows GPUs to be significantly faster than traditional CPUs for certain types of calculations.

Memory 104 may be any form of computer-usable memory, including but not limited to random access memory (RAM), read-only memory (ROM), and non-volatile memory (e.g., flash memory, hard disk drives, solid state drives, compact discs (CDs), digital video discs (DVDs), and/or tape storage). Thus, memory 104 represents both main memory units, as well as long-term storage. Herein, any non-volatile memory may be referred to as persistent storage.

Memory 104 may store program instructions and/or data on which program instructions may operate. By way of example, memory 104 may store these program instructions on a non-transitory, computer-readable medium, such that the instructions are executable by processor 102 to carry out any of the methods, processes, or operations disclosed in this specification or the accompanying drawings.

As shown in FIG. 1, memory 104 may include firmware 104A, kernel 104B, and/or applications 104C. Firmware 104A may be program code used to boot or otherwise initiate some or all of computing device 100. Kernel 104B may be an operating system, including modules for memory management, scheduling and management of processes, input/output, and communication. Kernel 104B may also include device drivers that allow the operating system to communicate with the hardware modules (e.g., memory units, networking interfaces, ports, and buses) of computing device 100. Applications 104C may be one or more user-space software programs, such as web browsers or email clients, as well as any software libraries used by these programs. Memory 104 may also store data used by these and other programs and applications.

Network interface 106 may take the form of one or more wireline interfaces, such as Ethernet (e.g., Fast Ethernet, Gigabit Ethernet, 10 Gigabit Ethernet, Ethernet over fiber, and so on). Network interface 106 may also support communication over one or more non-Ethernet media, such as coaxial cables or power lines, or over wide-area media, such as Synchronous Optical Networking (SONET), Synchronous Digital Hierarchy (SDH), Data Over Cable Service Interface Specification (DOCSIS), or other technologies. Network interface 106 may additionally take the form of one or more wireless interfaces, such as IEEE 802.11 (Wifi), BLUETOOTH®, global positioning system (GPS), or a wide-area wireless interface. However, other forms of physical layer interfaces and other types of standard or proprietary communication protocols may be used over network interface 106. Furthermore, network interface 106 may comprise multiple physical interfaces. For instance, some embodiments of computing device 100 may include Ethernet, BLUETOOTH®, and Wifi interfaces.

Input/output unit 108 may facilitate user and peripheral device interaction with computing device 100. Input/output unit 108 may include one or more types of input devices, such as a keyboard, a mouse, a touch screen, and so on. Similarly, input/output unit 108 may include one or more types of output devices, such as a screen, monitor, printer, and/or one or more light emitting diodes (LEDs). Additionally or alternatively, computing device 100 may communicate with other devices using a universal serial bus (USB) or high-definition multimedia interface (HDMI) port interface, for example.

In some embodiments, one or more computing devices like computing device 100 may be deployed. The exact physical location, connectivity, and configuration of these computing devices may be unknown and/or unimportant to client devices. Accordingly, the computing devices may be referred to as "cloud-based" devices that may be housed at various remote data center locations.

Figure 2:
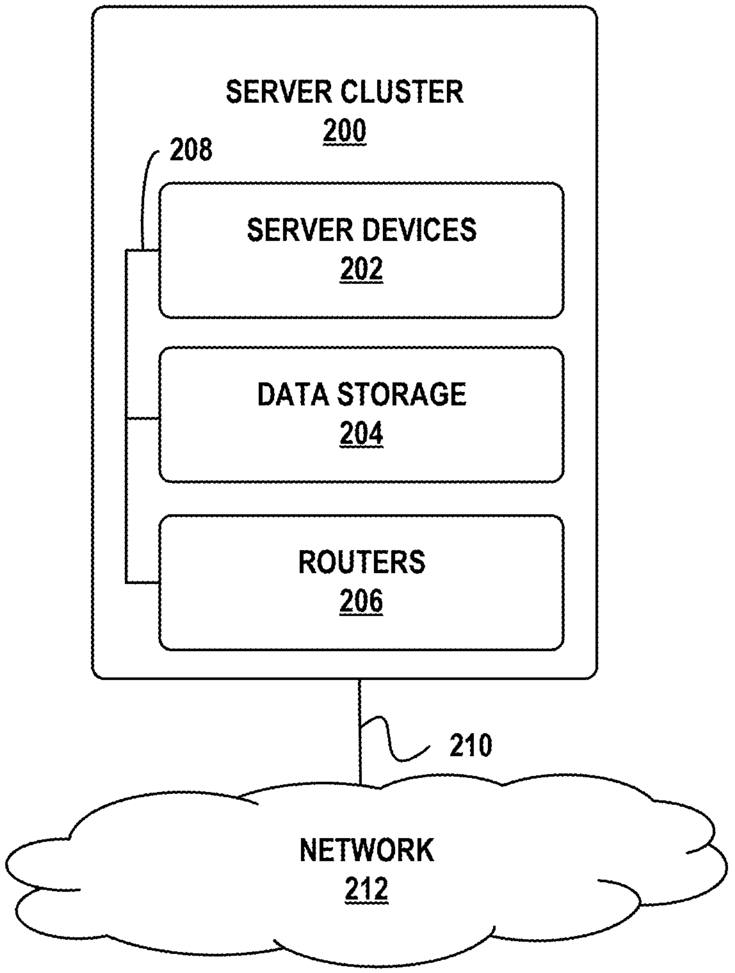
FIG. 2 illustrates a schematic drawing of a server device cluster, in accordance with example embodiments.

FIG. 2 depicts a cloud-based server cluster 200 in accordance with example embodiments. In FIG. 2, operations of a computing device (e.g., computing device 100) may be distributed between server devices 202, data storage 204, and routers 206, all of which may be connected by local cluster network 208. The number of server devices 202, data storages 204, and routers 206 in server cluster 200 may depend on the computing task(s) and/or applications assigned to server cluster 200.

For example, server devices 202 can be configured to perform various computing tasks of computing device 100. Thus, computing tasks can be distributed among one or more of server devices 202. To the extent that these computing tasks can be performed in parallel, such a distribution of tasks may reduce the total time to complete these tasks and return a result. For purposes of simplicity, both server cluster 200 and individual server devices 202 may be referred to as a "server device." This nomenclature should be understood to imply that one or more distinct server devices, data storage devices, and cluster routers may be involved in server device operations.

Data storage 204 may be data storage arrays that include drive array controllers configured to manage read and write access to groups of hard disk drives and/or solid state drives. The drive array controllers, alone or in conjunction with server devices 202, may also be configured to manage backup or redundant copies of the data stored in data storage 204 to protect against drive failures or other types of failures that prevent one or more of server devices 202 from accessing units of data storage 204. Other types of memory aside from drives may be used.

Routers 206 may include networking equipment configured to provide internal and external communications for server cluster 200. For example, routers 206 may include one or more packet-switching and/or routing devices (including switches and/or gateways) configured to provide (i) network communications between server devices 202 and data storage 204 via local cluster network 208, and/or (ii) network communications between server cluster 200 and other devices via communication link 210 to network 212.

Additionally, the configuration of routers 206 can be based at least in part on the data communication requirements of server devices 202 and data storage 204, the latency and throughput of the local cluster network 208, the latency, throughput, and cost of communication link 210, and/or other factors that may contribute to the cost, speed, fault-tolerance, resiliency, efficiency, and/or other design goals of the system architecture.

As a possible example, data storage 204 may include any form of database, such as a structured query language (SQL) database or a No-SQL database (e.g., MongoDB). Various types of data structures may store the information in such a database, including but not limited to files, tables, arrays, lists, trees, and tuples. Furthermore, any databases in data storage 204 may be monolithic or distributed across multiple physical devices.

Server devices 202 may be configured to transmit data to and receive data from data storage 204. This transmission and retrieval may take the form of SQL queries or other types of database queries, and the output of such queries, respectively. Additional text, images, video, and/or audio may be included as well. Furthermore, server devices 202 may organize the received data into web page or web application representations. Such a representation may take the form of a markup language, such as HTML, XML, JSON, or some other standardized or proprietary format. Moreover, server devices 202 may have the capability of executing various types of computerized scripting languages, such as but not limited to Perl, Python, PHP Hypertext Preprocessor (PHP), Active Server Pages (ASP), JAVASCRIPT®, and so on. Computer program code written in these languages may facilitate the providing of web pages to client devices, as well as client device interaction with the web pages. Alternatively or additionally, JAVA® may be used to facilitate generation of web pages and/or to provide web application functionality.

IV. Example Remote Network Management Architecture

Figure 3:
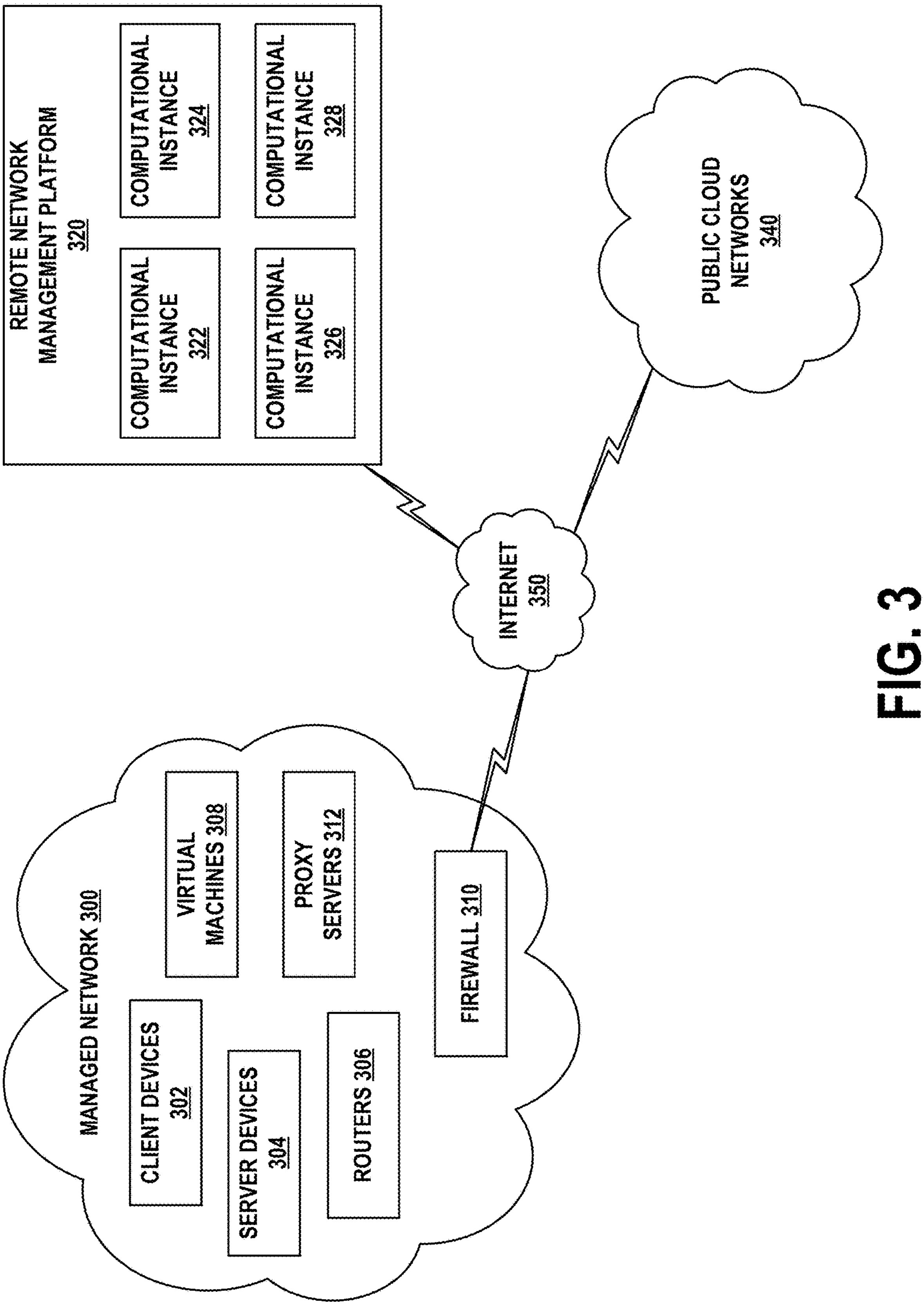
FIG. 3 depicts a remote network management architecture, in accordance with example embodiments.

FIG. 3 depicts a remote network management architecture, in accordance with example embodiments. This architecture includes three main components—managed network 300, remote network management platform 320, and public cloud networks 340—all connected by way of Internet 350.

A. Managed Networks

Managed network 300 may be, for example, an enterprise network used by an entity for computing and communications tasks, as well as storage of data. Thus, managed network 300 may include client devices 302, server devices 304, routers 306, virtual machines 308, firewall 310, and/or proxy servers 312. Client devices 302 may be embodied by computing device 100, server devices 304 may be embodied by computing device 100 or server cluster 200, and routers 306 may be any type of router, switch, or gateway.

Virtual machines 308 may be embodied by one or more of computing device 100 or server cluster 200. In general, a virtual machine is an emulation of a computing system, and mimics the functionality (e.g., processor, memory, and communication resources) of a physical computer. One physical computing system, such as server cluster 200, may support up to thousands of individual virtual machines. In some embodiments, virtual machines 308 may be managed by a centralized server device or application that facilitates allocation of physical computing resources to individual virtual machines, as well as performance and error reporting. Enterprises often employ virtual machines in order to allocate computing resources in an efficient, as needed fashion. Providers of virtualized computing systems include VMWARE® and MICROSOFT®.

Firewall 310 may be one or more specialized routers or server devices that protect managed network 300 from unauthorized attempts to access the devices, applications, and services therein, while allowing authorized communication that is initiated from managed network 300. Firewall 310 may also provide intrusion detection, web filtering, virus scanning, application-layer gateways, and other applications or services. In some embodiments not shown in FIG. 3, managed network 300 may include one or more virtual private network (VPN) gateways with which it communicates with remote network management platform 320 (see below).

Managed network 300 may also include one or more proxy servers 312. An embodiment of proxy servers 312 may be a server application that facilitates communication and movement of data between managed network 300, remote network management platform 320, and public cloud networks 340. In particular, proxy servers 312 may be able to establish and maintain secure communication sessions with one or more computational instances of remote network management platform 320. By way of such a session, remote network management platform 320 may be able to discover and manage aspects of the architecture and configuration of managed network 300 and its components.

Possibly with the assistance of proxy servers 312, remote network management platform 320 may also be able to discover and manage aspects of public cloud networks 340 that are used by managed network 300. While not shown in FIG. 3, one or more proxy servers 312 may be placed in any of public cloud networks 340 in order to facilitate this discovery and management.

Firewalls, such as firewall 310, typically deny all communication sessions that are incoming by way of Internet 350, unless such a session was ultimately initiated from behind the firewall (i.e., from a device on managed network 300) or the firewall has been explicitly configured to support the session. By placing proxy servers 312 behind firewall 310 (e.g., within managed network 300 and protected by firewall 310), proxy servers 312 may be able to initiate these communication sessions through firewall 310. Thus, firewall 310 might not have to be specifically configured to support incoming sessions from remote network management platform 320, thereby avoiding potential security risks to managed network 300.

In some cases, managed network 300 may consist of a few devices and a small number of networks. In other deployments, managed network 300 may span multiple physical locations and include hundreds of networks and hundreds of thousands of devices. Thus, the architecture depicted in FIG. 3 is capable of scaling up or down by orders of magnitude.

Furthermore, depending on the size, architecture, and connectivity of managed network 300, a varying number of proxy servers 312 may be deployed therein. For example, each one of proxy servers 312 may be responsible for communicating with remote network management platform 320 regarding a portion of managed network 300. Alternatively or additionally, sets of two or more proxy servers may be assigned to such a portion of managed network 300 for purposes of load balancing, redundancy, and/or high availability.

B. Remote Network Management Platforms

Remote network management platform 320 is a hosted environment that provides aPaaS services to users, particularly to the operator of managed network 300. These services may take the form of web-based portals, for example, using the aforementioned web-based technologies. Thus, a user can securely access remote network management platform 320 from, for example, client devices 302, or potentially from a client device outside of managed network 300. By way of the web-based portals, users may design, test, and deploy applications, generate reports, view analytics, and perform other tasks. Remote network management platform 320 may also be referred to as a multi-application platform.

As shown in FIG. 3, remote network management platform 320 includes four computational instances 322, 324, 326, and 328. Each of these computational instances may represent one or more server nodes operating dedicated copies of the aPaaS software and/or one or more database nodes. The arrangement of server and database nodes on physical server devices and/or virtual machines can be flexible and may vary based on enterprise needs. In combination, these nodes may provide a set of web portals, services, and applications (e.g., a wholly-functioning aPaaS system) available to a particular enterprise. In some cases, a single enterprise may use multiple computational instances.

For example, managed network 300 may be an enterprise customer of remote network management platform 320, and may use computational instances 322, 324, and 326. The reason for providing multiple computational instances to one customer is that the customer may wish to independently develop, test, and deploy its applications and services. Thus, computational instance 322 may be dedicated to application development related to managed network 300, computational instance 324 may be dedicated to testing these applications, and computational instance 326 may be dedicated to the live operation of tested applications and services. A computational instance may also be referred to as a hosted instance, a remote instance, a customer instance, or by some other designation. Any application deployed onto a computational instance may be a scoped application, in that its access to databases within the computational instance can be restricted to certain elements therein (e.g., one or more particular database tables or particular rows within one or more database tables).

For purposes of clarity, the disclosure herein refers to the arrangement of application nodes, database nodes, aPaaS software executing thereon, and underlying hardware as a "computational instance." Note that users may colloquially refer to the graphical user interfaces provided thereby as "instances." But unless it is defined otherwise herein, a "computational instance" is a computing system disposed within remote network management platform 320.

The multi-instance architecture of remote network management platform 320 is in contrast to conventional multi-tenant architectures, over which multi-instance architectures exhibit several advantages. In multi-tenant architectures, data from different customers (e.g., enterprises) are comingled in a single database. While these customers' data are separate from one another, the separation is enforced by the software that operates the single database. As a consequence, a security breach in this system may affect all customers' data, creating additional risk, especially for entities subject to governmental, healthcare, and/or financial regulation. Furthermore, any database operations that affect one customer will likely affect all customers sharing that database. Thus, if there is an outage due to hardware or software errors, this outage affects all such customers. Likewise, if the database is to be upgraded to meet the needs of one customer, it will be unavailable to all customers during the upgrade process. Often, such maintenance windows will be long, due to the size of the shared database.

In contrast, the multi-instance architecture provides each customer with its own database in a dedicated computing instance. This prevents comingling of customer data, and allows each instance to be independently managed. For example, when one customer's instance experiences an outage due to errors or an upgrade, other computational instances are not impacted. Maintenance down time is limited because the database only contains one customer's data. Further, the simpler design of the multi-instance architecture allows redundant copies of each customer database and instance to be deployed in a geographically diverse fashion. This facilitates high availability, where the live version of the customer's instance can be moved when faults are detected or maintenance is being performed.

In some embodiments, remote network management platform 320 may include one or more central instances, controlled by the entity that operates this platform. Like a computational instance, a central instance may include some number of application and database nodes disposed upon some number of physical server devices or virtual machines. Such a central instance may serve as a repository for specific configurations of computational instances as well as data that can be shared amongst at least some of the computational instances. For instance, definitions of common security threats that could occur on the computational instances, software packages that are commonly discovered on the computational instances, and/or an application store for applications that can be deployed to the computational instances may reside in a central instance. Computational instances may communicate with central instances by way of well-defined interfaces in order to obtain this data.

In order to support multiple computational instances in an efficient fashion, remote network management platform 320 may implement a plurality of these instances on a single hardware platform. For example, when the aPaaS system is implemented on a server cluster such as server cluster 200, it may operate virtual machines that dedicate varying amounts of computational, storage, and communication resources to instances. But full virtualization of server cluster 200 might not be necessary, and other mechanisms may be used to separate instances. In some examples, each instance may have a dedicated account and one or more dedicated databases on server cluster 200. Alternatively, a computational instance such as computational instance 322 may span multiple physical devices.

In some cases, a single server cluster of remote network management platform 320 may support multiple independent enterprises. Furthermore, as described below, remote network management platform 320 may include multiple server clusters deployed in geographically diverse data centers in order to facilitate load balancing, redundancy, and/or high availability.

C. Public Cloud Networks

Public cloud networks 340 may be remote server devices (e.g., a plurality of server clusters such as server cluster 200) that can be used for outsourced computation, data storage, communication, and service hosting operations. These servers may be virtualized (i.e., the servers may be virtual machines). Examples of public cloud networks 340 may include Amazon AWS Cloud, Microsoft Azure Cloud (Azure), Google Cloud Platform (GCP), and IBM Cloud Platform. Like remote network management platform 320, multiple server clusters supporting public cloud networks 340 may be deployed at geographically diverse locations for purposes of load balancing, redundancy, and/or high availability.

Managed network 300 may use one or more of public cloud networks 340 to deploy applications and services to its clients and customers. For instance, if managed network 300 provides online music streaming services, public cloud networks 340 may store the music files and provide web interface and streaming capabilities. In this way, the enterprise of managed network 300 does not have to build and maintain its own servers for these operations.

Remote network management platform 320 may include modules that integrate with public cloud networks 340 to expose virtual machines and managed services therein to managed network 300. The modules may allow users to request virtual resources, discover allocated resources, and provide flexible reporting for public cloud networks 340. In order to establish this functionality, a user from managed network 300 might first establish an account with public cloud networks 340, and request a set of associated resources. Then, the user may enter the account information into the appropriate modules of remote network management platform 320. These modules may then automatically discover the manageable resources in the account, and also provide reports related to usage, performance, and billing.

D. Communication Support and Other Operations

Internet 350 may represent a portion of the global Internet. However, Internet 350 may alternatively represent a different type of network, such as a private wide-area or local-area packet-switched network.

Figure 4:
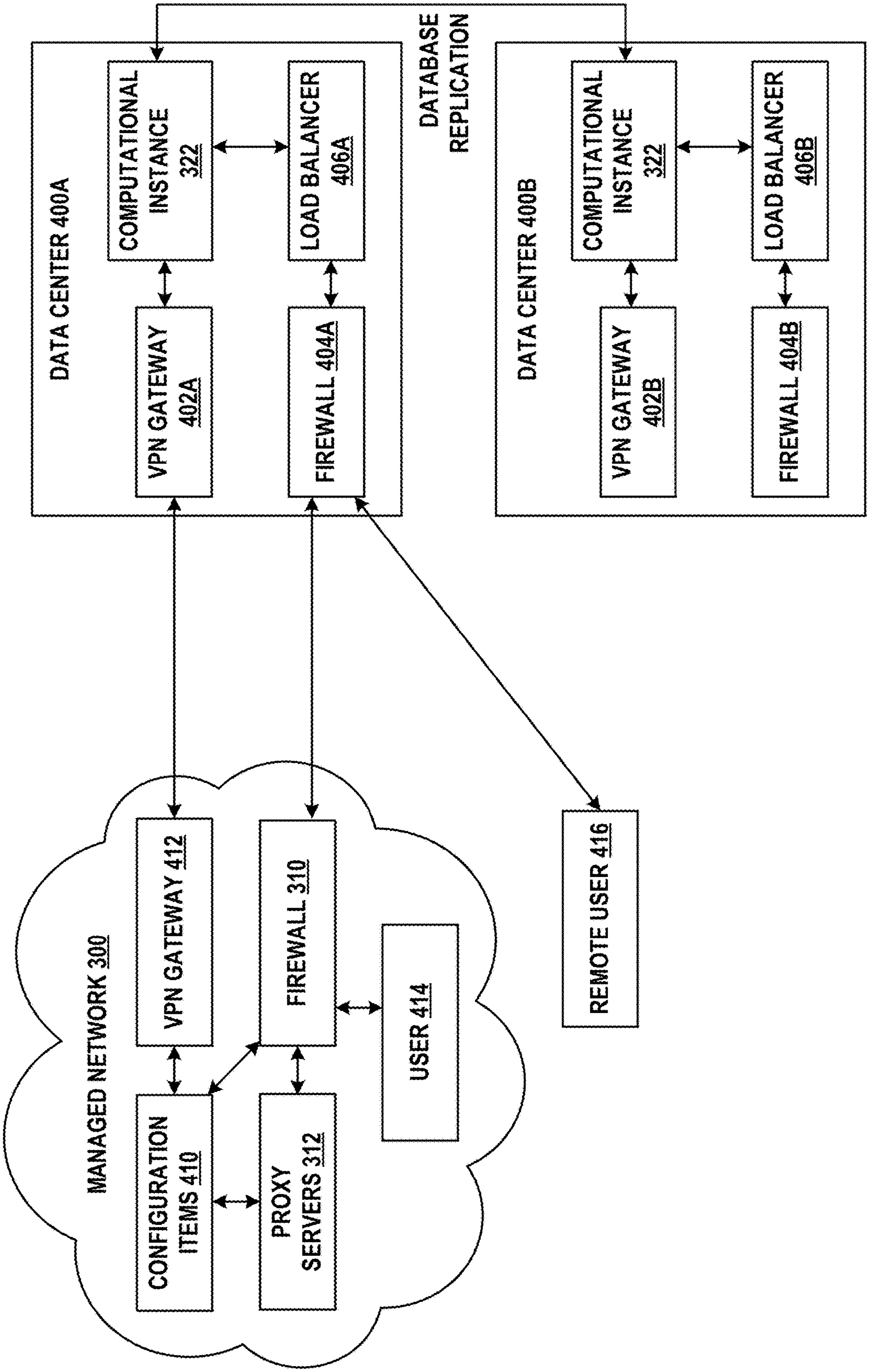
FIG. 4 depicts a communication environment involving a remote network management architecture, in accordance with example embodiments.

FIG. 4 further illustrates the communication environment between managed network 300 and computational instance 322, and introduces additional features and alternative embodiments. In FIG. 4, computational instance 322 is replicated, in whole or in part, across data centers 400A and 400B. These data centers may be geographically distant from one another, perhaps in different cities or different countries. Each data center includes support equipment that facilitates communication with managed network 300, as well as remote users.

In data center 400A, network traffic to and from external devices flows either through VPN gateway 402A or firewall 404A. VPN gateway 402A may be peered with VPN gateway 412 of managed network 300 by way of a security protocol such as Internet Protocol Security (IPSEC) or Transport Layer Security (TLS). Firewall 404A may be configured to allow access from authorized users, such as user 414 and remote user 416, and to deny access to unauthorized users. By way of firewall 404A, these users may access computational instance 322, and possibly other computational instances. Load balancer 406A may be used to distribute traffic amongst one or more physical or virtual server devices that host computational instance 322. Load balancer 406A may simplify user access by hiding the internal configuration of data center 400A, (e.g., computational instance 322) from client devices. For instance, if computational instance 322 includes multiple physical or virtual computing devices that share access to multiple databases, load balancer 406A may distribute network traffic and processing tasks across these computing devices and databases so that no one computing device or database is significantly busier than the others. In some embodiments, computational instance 322 may include VPN gateway 402A, firewall 404A, and load balancer 406A.

Data center 400B may include its own versions of the components in data center 400A. Thus, VPN gateway 402B, firewall 404B, and load balancer 406B may perform the same or similar operations as VPN gateway 402A, firewall 404A, and load balancer 406A, respectively. Further, by way of real-time or near-real-time database replication and/or other operations, computational instance 322 may exist simultaneously in data centers 400A and 400B.

Data centers 400A and 400B as shown in FIG. 4 may facilitate redundancy and high availability. In the configuration of FIG. 4, data center 400A is active and data center 400B is passive. Thus, data center 400A is serving all traffic to and from managed network 300, while the version of computational instance 322 in data center 400B is being updated in near-real-time. Other configurations, such as one in which both data centers are active, may be supported.

Should data center 400A fail in some fashion or otherwise become unavailable to users, data center 400B can take over as the active data center. For example, domain name system (DNS) servers that associate a domain name of computational instance 322 with one or more Internet Protocol (IP) addresses of data center 400A may re-associate the domain name with one or more IP addresses of data center 400B. After this re-association completes (which may take less than one second or several seconds), users may access computational instance 322 by way of data center 400B.

FIG. 4 also illustrates a possible configuration of managed network 300. As noted above, proxy servers 312 and user 414 may access computational instance 322 through firewall 310. Proxy servers 312 may also access configuration items 410. In FIG. 4, configuration items 410 may refer to any or all of client devices 302, server devices 304, routers 306, and virtual machines 308, any components thereof, any applications or services executing thereon, as well as relationships between devices, components, applications, and services. Thus, the term "configuration items" may be shorthand for part of all of any physical or virtual device, or any application or service remotely discoverable or managed by computational instance 322, or relationships between discovered devices, applications, and services. Configuration items may be represented in a configuration management database (CMDB) of computational instance 322.

As stored or transmitted, a configuration item may be a list of attributes that characterize the hardware or software that the configuration item represents. These attributes may include manufacturer, vendor, location, owner, unique identifier, description, network address, operational status, serial number, time of last update, and so on. The class of a configuration item may determine which subset of attributes are present for the configuration item (e.g., software and hardware configuration items may have different lists of attributes).

As noted above, VPN gateway 412 may provide a dedicated VPN to VPN gateway 402A. Such a VPN may be helpful when there is a significant amount of traffic between managed network 300 and computational instance 322, or security policies otherwise suggest or require use of a VPN between these sites. In some embodiments, any device in managed network 300 and/or computational instance 322 that directly communicates via the VPN is assigned a public IP address. Other devices in managed network 300 and/or computational instance 322 may be assigned private IP addresses (e.g., IP addresses selected from the 10.0.0.0-10.255.255.255 or 192.168.0.0-192.168.255.255 ranges, represented in shorthand as subnets 10.0.0.0/8 and 192.168.0.0/16, respectively). In various alternatives, devices in managed network 300, such as proxy servers 312, may use a secure protocol (e.g., TLS) to communicate directly with one or more data centers.

V. Example Discovery

In order for remote network management platform 320 to administer the devices, applications, and services of managed network 300, remote network management platform 320 may first determine what devices are present in managed network 300, the configurations, constituent components, and operational statuses of these devices, and the applications and services provided by the devices. Remote network management platform 320 may also determine the relationships between discovered devices, their components, applications, and services. Representations of these devices, components, applications, and services may be referred to as configuration items.

The process of determining the configuration items and relationships therebetween within managed network 300 is referred to as discovery, and may be facilitated at least in part by proxy servers 312. To that point, proxy servers 312 may relay discovery requests and responses between managed network 300 and remote network management platform 320.

Configuration items and relationships may be stored in a CMDB and/or other locations. Further, configuration items may be of various classes that define their constituent attributes and that exhibit an inheritance structure not unlike object-oriented software modules. For instance, a configuration item class of "server" may inherit all attributes from a configuration item class of "hardware" and also include further server-specific attributes. Likewise, a configuration item class of "LINUX® server" may inherit all attributes from the configuration item class of "server" and also include further LINUX®-specific attributes. Additionally, configuration items may represent other components, such as services, data center infrastructure, software licenses, units of source code, configuration files, and documents.

While this section describes discovery conducted on managed network 300, the same or similar discovery procedures may be used on public cloud networks 340. Thus, in some environments, "discovery" may refer to discovering configuration items and relationships on a managed network and/or one or more public cloud networks.

For purposes of the embodiments herein, an "application" may refer to one or more processes, threads, programs, client software modules, server software modules, or any other software that executes on a device or group of devices. A "service" may refer to a high-level capability provided by one or more applications executing on one or more devices working in conjunction with one another. For example, a web service may involve multiple web application server threads executing on one device and accessing information from a database application that executes on another device.

Figure 5:
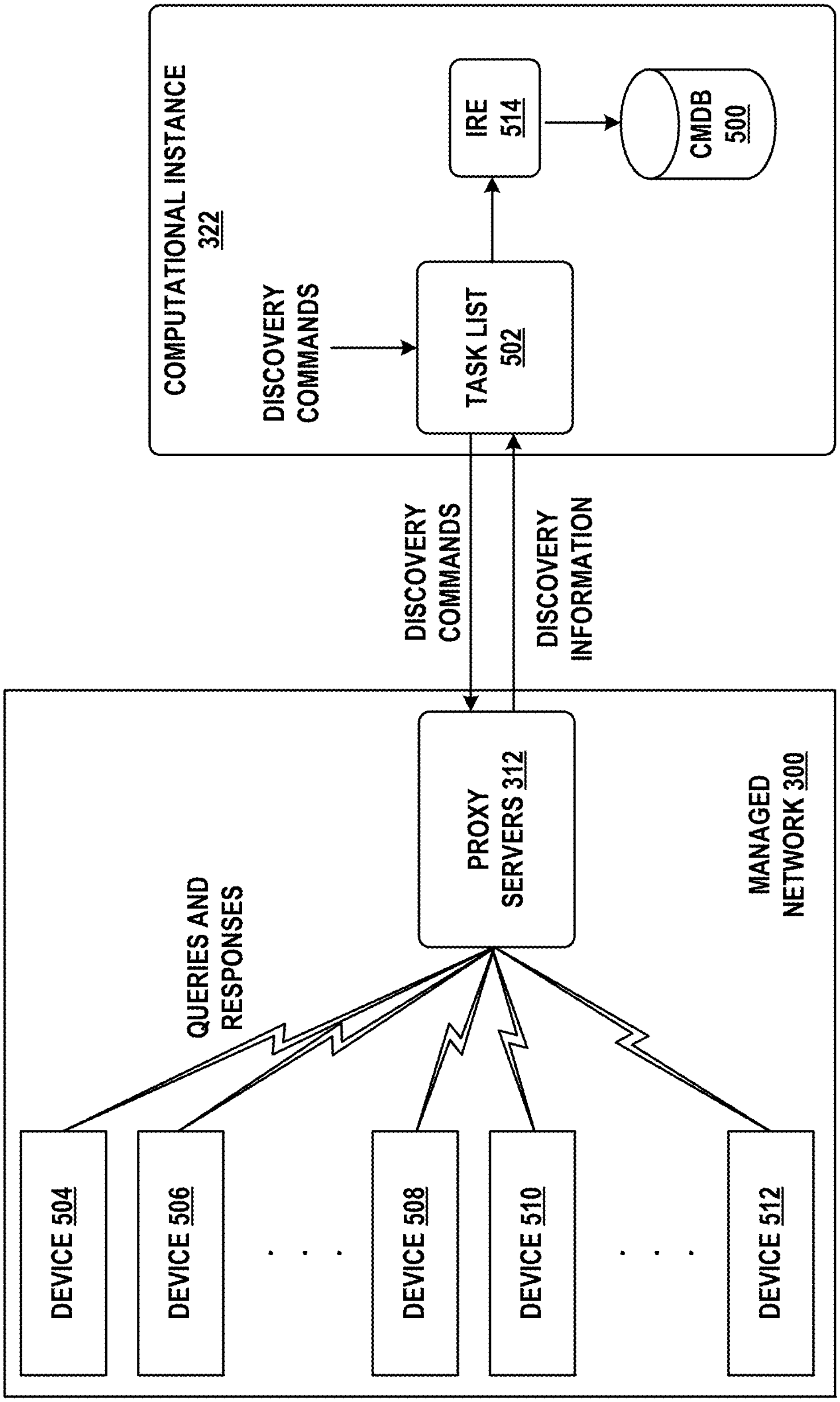
FIG. 5 depicts another communication environment involving a remote network management architecture, in accordance with example embodiments.

FIG. 5 provides a logical depiction of how configuration items and relationships can be discovered, as well as how information related thereto can be stored. For sake of simplicity, remote network management platform 320, public cloud networks 340, and Internet 350 are not shown.

In FIG. 5, CMDB 500, task list 502, and identification and reconciliation engine (IRE) 514 are disposed and/or operate within computational instance 322. Task list 502 represents a connection point between computational instance 322 and proxy servers 312. Task list 502 may be referred to as a queue, or more particularly as an external communication channel (ECC) queue. Task list 502 may represent not only the queue itself but any associated processing, such as adding, removing, and/or manipulating information in the queue.

As discovery takes place, computational instance 322 may store discovery tasks (jobs) that proxy servers 312 are to perform in task list 502, until proxy servers 312 request these tasks in batches of one or more. Placing the tasks in task list 502 may trigger or otherwise cause proxy servers 312 to begin their discovery operations. For example, proxy servers 312 may poll task list 502 periodically or from time to time, or may be notified of discovery commands in task list 502 in some other fashion. Alternatively or additionally, discovery may be manually triggered or automatically triggered based on triggering events (e.g., discovery may automatically begin once per day at a particular time).

Regardless, computational instance 322 may transmit these discovery commands to proxy servers 312 upon request. For example, proxy servers 312 may repeatedly query task list 502, obtain the next task therein, and perform this task until task list 502 is empty or another stopping condition has been reached. In response to receiving a discovery command, proxy servers 312 may query various devices, components, applications, and/or services in managed network 300 (represented for sake of simplicity in FIG. 5 by devices 504, 506, 508, 510, and 512). These devices, components, applications, and/or services may provide responses relating to their configuration, operation, and/or status to proxy servers 312. In turn, proxy servers 312 may then provide this discovered information to task list 502 (i.e., task list 502 may have an outgoing queue for holding discovery commands until requested by proxy servers 312 as well as an incoming queue for holding the discovery information until it is read).

IRE 514 may be a software module that removes discovery information from task list 502 and formulates this discovery information into configuration items (e.g., representing devices, components, applications, and/or services discovered on managed network 300) as well as relationships therebetween. Then, IRE 514 may provide these configuration items and relationships to CMDB 500 for storage therein. The operation of IRE 514 is described in more detail below.

In this fashion, configuration items stored in CMDB 500 represent the environment of managed network 300. As an example, these configuration items may represent a set of physical and/or virtual devices (e.g., client devices, server devices, routers, or virtual machines), applications executing thereon (e.g., web servers, email servers, databases, or storage arrays), as well as services that involve multiple individual configuration items. Relationships may be pairwise definitions of arrangements or dependencies between configuration items.

In order for discovery to take place in the manner described above, proxy servers 312, CMDB 500, and/or one or more credential stores may be configured with credentials for the devices to be discovered. Credentials may include any type of information needed in order to access the devices. These may include userid/password pairs, certificates, and so on. In some embodiments, these credentials may be stored in encrypted fields of CMDB 500. Proxy servers 312 may contain the decryption key for the credentials so that proxy servers 312 can use these credentials to log on to or otherwise access devices being discovered.

There are two general types of discovery—horizontal and vertical (top-down). Each are discussed below.

A. Horizontal Discovery

Horizontal discovery is used to scan managed network 300, find devices, components, and/or applications, and then populate CMDB 500 with configuration items representing these devices, components, and/or applications. Horizontal discovery also creates relationships between the configuration items. For instance, this could be a "runs on" relationship between a configuration item representing a software application and a configuration item representing a server device on which it executes. Typically, horizontal discovery is not aware of services and does not create relationships between configuration items based on the services in which they operate.

There are two versions of horizontal discovery. One relies on probes and sensors, while the other also employs patterns. Probes and sensors may be scripts (e.g., written in JAVASCRIPT®) that collect and process discovery information on a device and then update CMDB 500 accordingly. More specifically, probes explore or investigate devices on managed network 300, and sensors parse the discovery information returned from the probes.

Patterns are also scripts that collect data on one or more devices, process it, and update the CMDB. Patterns differ from probes and sensors in that they are written in a specific discovery programming language and are used to conduct detailed discovery procedures on specific devices, components, and/or applications that often cannot be reliably discovered (or discovered at all) by more general probes and sensors. Particularly, patterns may specify a series of operations that define how to discover a particular arrangement of devices, components, and/or applications, what credentials to use, and which CMDB tables to populate with configuration items resulting from this discovery.

Both versions may proceed in four logical phases: scanning, classification, identification, and exploration. Also, both versions may require specification of one or more ranges of IP addresses on managed network 300 for which discovery is to take place. Each phase may involve communication between devices on managed network 300 and proxy servers 312, as well as between proxy servers 312 and task list 502. Some phases may involve storing partial or preliminary configuration items in CMDB 500, which may be updated in a later phase.

In the scanning phase, proxy servers 312 may probe each IP address in the specified range(s) of IP addresses for open Transmission Control Protocol (TCP) and/or User Datagram Protocol (UDP) ports to determine the general type of device and its operating system. The presence of such open ports at an IP address may indicate that a particular application is operating on the device that is assigned the IP address, which in turn may identify the operating system used by the device. For example, if TCP port 135 is open, then the device is likely executing a WINDOWS® operating system. Similarly, if TCP port 22 is open, then the device is likely executing a UNIX® operating system, such as LINUX®. If UDP port 161 is open, then the device may be able to be further identified through the Simple Network Management Protocol (SNMP). Other possibilities exist.

In the classification phase, proxy servers 312 may further probe each discovered device to determine the type of its operating system. The probes used for a particular device are based on information gathered about the devices during the scanning phase. For example, if a device is found with TCP port 22 open, a set of UNIX®-specific probes may be used. Likewise, if a device is found with TCP port 135 open, a set of WINDOWS®-specific probes may be used. For either case, an appropriate set of tasks may be placed in task list 502 for proxy servers 312 to carry out. These tasks may result in proxy servers 312 logging on, or otherwise accessing information from the particular device. For instance, if TCP port 22 is open, proxy servers 312 may be instructed to initiate a Secure Shell (SSH) connection to the particular device and obtain information about the specific type of operating system thereon from particular locations in the file system. Based on this information, the operating system may be determined. As an example, a UNIX® device with TCP port 22 open may be classified as AIX®, HPUX, LINUX®, MACOS®, or SOLARIS®. This classification information may be stored as one or more configuration items in CMDB 500.

In the identification phase, proxy servers 312 may determine specific details about a classified device. The probes used during this phase may be based on information gathered about the particular devices during the classification phase. For example, if a device was classified as LINUX®, a set of LINUX®-specific probes may be used. Likewise, if a device was classified as WINDOWS® 10, as a set of WINDOWS®-10-specific probes may be used. As was the case for the classification phase, an appropriate set of tasks may be placed in task list 502 for proxy servers 312 to carry out. These tasks may result in proxy servers 312 reading information from the particular device, such as basic input/output system (BIOS) information, serial numbers, network interface information, media access control address(es) assigned to these network interface(s), IP address(es) used by the particular device and so on. This identification information may be stored as one or more configuration items in CMDB 500 along with any relevant relationships therebetween. Doing so may involve passing the identification information through IRE 514 to avoid generation of duplicate configuration items, for purposes of disambiguation, and/or to determine the table(s) of CMDB 500 in which the discovery information should be written.

In the exploration phase, proxy servers 312 may determine further details about the operational state of a classified device. The probes used during this phase may be based on information gathered about the particular devices during the classification phase and/or the identification phase. Again, an appropriate set of tasks may be placed in task list 502 for proxy servers 312 to carry out. These tasks may result in proxy servers 312 reading additional information from the particular device, such as processor information, memory information, lists of running processes (software applications), and so on. Once more, the discovered information may be stored as one or more configuration items in CMDB 500, as well as relationships.

Running horizontal discovery on certain devices, such as switches and routers, may utilize SNMP. Instead of or in addition to determining a list of running processes or other application-related information, discovery may determine additional subnets known to a router and the operational state of the router's network interfaces (e.g., active, inactive, queue length, number of packets dropped, etc.). The IP addresses of the additional subnets may be candidates for further discovery procedures. Thus, horizontal discovery may progress iteratively or recursively.

Patterns are used only during the identification and exploration phases—under pattern-based discovery, the scanning and classification phases operate as they would if probes and sensors are used. After the classification stage completes, a pattern probe is specified as a probe to use during identification. Then, the pattern probe and the pattern that it specifies are launched.

Patterns support a number of features, by way of the discovery programming language, that are not available or difficult to achieve with discovery using probes and sensors. For example, discovery of devices, components, and/or applications in public cloud networks, as well as configuration file tracking, is much simpler to achieve using pattern-based discovery. Further, these patterns are more easily customized by users than probes and sensors. Additionally, patterns are more focused on specific devices, components, and/or applications and therefore may execute faster than the more general approaches used by probes and sensors.

Once horizontal discovery completes, a configuration item representation of each discovered device, component, and/or application is available in CMDB 500. For example, after discovery, operating system version, hardware configuration, and network configuration details for client devices, server devices, and routers in managed network 300, as well as applications executing thereon, may be stored as configuration items. This collected information may be presented to a user in various ways to allow the user to view the hardware composition and operational status of devices.

Furthermore, CMDB 500 may include entries regarding the relationships between configuration items. More specifically, suppose that a server device includes a number of hardware components (e.g., processors, memory, network interfaces, storage, and file systems), and has several software applications installed or executing thereon. Relationships between the components and the server device (e.g., "contained by" relationships) and relationships between the software applications and the server device (e.g., "runs on" relationships) may be represented as such in CMDB 500.

More generally, the relationship between a software configuration item installed or executing on a hardware configuration item may take various forms, such as "is hosted on", "runs on", or "depends on". Thus, a database application installed on a server device may have the relationship "is hosted on" with the server device to indicate that the database application is hosted on the server device. In some embodiments, the server device may have a reciprocal relationship of "used by" with the database application to indicate that the server device is used by the database application. These relationships may be automatically found using the discovery procedures described above, though it is possible to manually set relationships as well.

In this manner, remote network management platform 320 may discover and inventory the hardware and software deployed on and provided by managed network 300.

B. Vertical Discovery

Vertical discovery is a technique used to find and map configuration items that are part of an overall service, such as a web service. For example, vertical discovery can map a web service by showing the relationships between a web server application, a LINUX® server device, and a database that stores the data for the web service. Typically, horizontal discovery is run first to find configuration items and basic relationships therebetween, and then vertical discovery is run to establish the relationships between configuration items that make up a service.

Patterns can be used to discover certain types of services, as these patterns can be programmed to look for specific arrangements of hardware and software that fit a description of how the service is deployed. Alternatively or additionally, traffic analysis (e.g., examining network traffic between devices) can be used to facilitate vertical discovery. In some cases, the parameters of a service can be manually configured to assist vertical discovery.

In general, vertical discovery seeks to find specific types of relationships between devices, components, and/or applications. Some of these relationships may be inferred from configuration files. For example, the configuration file of a web server application can refer to the IP address and port number of a database on which it relies. Vertical discovery patterns can be programmed to look for such references and infer relationships therefrom. Relationships can also be inferred from traffic between devices—for instance, if there is a large extent of web traffic (e.g., TCP port 80 or 8080) traveling between a load balancer and a device hosting a web server, then the load balancer and the web server may have a relationship.

Relationships found by vertical discovery may take various forms. As an example, an email service may include an email server software configuration item and a database application software configuration item, each installed on different hardware device configuration items. The email service may have a "depends on" relationship with both of these software configuration items, while the software configuration items have a "used by" reciprocal relationship with the email service. Such services might not be able to be fully determined by horizontal discovery procedures, and instead may rely on vertical discovery and possibly some extent of manual configuration.

C. Advantages of Discovery

Regardless of how discovery information is obtained, it can be valuable for the operation of a managed network. Notably, IT personnel can quickly determine where certain software applications are deployed, and what configuration items make up a service. This allows for rapid pinpointing of root causes of service outages or degradation. For example, if two different services are suffering from slow response times, the CMDB can be queried (perhaps among other activities) to determine that the root cause is a database application that is used by both services having high processor utilization. Thus, IT personnel can address the database application rather than waste time considering the health and performance of other configuration items that make up the services.

In another example, suppose that a database application is executing on a server device, and that this database application is used by an employee onboarding service as well as a payroll service. Thus, if the server device is taken out of operation for maintenance, it is clear that the employee onboarding service and payroll service will be impacted. Likewise, the dependencies and relationships between configuration items may be able to represent the services impacted when a particular hardware device fails.

In general, configuration items and/or relationships between configuration items may be displayed on a web-based interface and represented in a hierarchical fashion. Modifications to such configuration items and/or relationships in the CMDB may be accomplished by way of this interface.

Furthermore, users from managed network 300 may develop workflows that allow certain coordinated activities to take place across multiple discovered devices. For instance, an IT workflow might allow the user to change the common administrator password to all discovered LINUX® devices in a single operation.

VI. CMDB Identification Rules and Reconciliation

A CMDB, such as CMDB 500, provides a repository of configuration items and relationships. When properly provisioned, it can take on a key role in higher-layer applications deployed within or involving a computational instance. These applications may relate to enterprise IT service management, operations management, asset management, configuration management, compliance, and so on.

For example, an IT service management application may use information in the CMDB to determine applications and services that may be impacted by a component (e.g., a server device) that has malfunctioned, crashed, or is heavily loaded. Likewise, an asset management application may use information in the CMDB to determine which hardware and/or software components are being used to support particular enterprise applications. As a consequence of the importance of the CMDB, it is desirable for the information stored therein to be accurate, consistent, and up to date.

A CMDB may be populated in various ways. As discussed above, a discovery procedure may automatically store information including configuration items and relationships in the CMDB. However, a CMDB can also be populated, as a whole or in part, by manual entry, configuration files, and third-party data sources. Given that multiple data sources may be able to update the CMDB at any time, it is possible that one data source may overwrite entries of another data source. Also, two data sources may each create slightly different entries for the same configuration item, resulting in a CMDB containing duplicate data. When either of these occurrences takes place, they can cause the health and utility of the CMDB to be reduced.

In order to mitigate this situation, these data sources might not write configuration items directly to the CMDB. Instead, they may write to an identification and reconciliation application programming interface (API) of IRE 514. Then, IRE 514 may use a set of configurable identification rules to uniquely identify configuration items and determine whether and how they are to be written to the CMDB.

In general, an identification rule specifies a set of configuration item attributes that can be used for this unique identification. Identification rules may also have priorities so that rules with higher priorities are considered before rules with lower priorities. Additionally, a rule may be independent, in that the rule identifies configuration items independently of other configuration items. Alternatively, the rule may be dependent, in that the rule first uses a metadata rule to identify a dependent configuration item.

Metadata rules describe which other configuration items are contained within a particular configuration item, or the host on which a particular configuration item is deployed. For example, a network directory service configuration item may contain a domain controller configuration item, while a web server application configuration item may be hosted on a server device configuration item.

A goal of each identification rule is to use a combination of attributes that can unambiguously distinguish a configuration item from all other configuration items, and is expected not to change during the lifetime of the configuration item. Some possible attributes for an example server device may include serial number, location, operating system, operating system version, memory capacity, and so on. If a rule specifies attributes that do not uniquely identify the configuration item, then multiple components may be represented as the same configuration item in the CMDB. Also, if a rule specifies attributes that change for a particular configuration item, duplicate configuration items may be created.

Thus, when a data source provides information regarding a configuration item to IRE 514, IRE 514 may attempt to match the information with one or more rules. If a match is found, the configuration item is written to the CMDB or updated if it already exists within the CMDB. If a match is not found, the configuration item may be held for further analysis.

Configuration item reconciliation procedures may be used to ensure that only authoritative data sources are allowed to overwrite configuration item data in the CMDB. This reconciliation may also be rules-based. For instance, a reconciliation rule may specify that a particular data source is authoritative for a particular configuration item type and set of attributes. Then, IRE 514 might only permit this authoritative data source to write to the particular configuration item, and writes from unauthorized data sources may be prevented. Thus, the authorized data source becomes the single source of truth regarding the particular configuration item. In some cases, an unauthorized data source may be allowed to write to a configuration item if it is creating the configuration item or the attributes to which it is writing are empty.

Additionally, multiple data sources may be authoritative for the same configuration item or attributes thereof. To avoid ambiguities, these data sources may be assigned precedences that are taken into account during the writing of configuration items. For example, a secondary authorized data source may be able to write to a configuration item's attribute until a primary authorized data source writes to this attribute. Afterward, further writes to the attribute by the secondary authorized data source may be prevented.

In some cases, duplicate configuration items may be automatically detected by IRE 514 or in another fashion. These configuration items may be deleted or flagged for manual de-duplication.

VII. Task-Based Applications and Work Items

Remote network management platform 320 may furnish various service management solutions including task-based applications designed to streamline and manage specific processes. Some examples are incident management, case management, problem management, field service management, and assignment of computing tasks to execution infrastructure.

A. Task-Based Applications

Incident management focuses on the efficient resolution of IT service disruptions or incidents. When an issue or disruption occurs, it may be logged as an incident in an incident management application. This application allows IT teams to track and manage these incidents throughout their lifecycles. It includes features such as incident creation/generation, assignment, prioritization, escalation, communication, and resolution. The incident management application provides workflows, notifications, and collaboration tools to facilitate the prompt and efficient addressing of incidents, with a goal of minimizing their impact on platform and system operations.

Case management is designed to handle diverse types of processes, requests, or workflows. It enables users to manage complex cases that require coordination across multiple groups. The case management application provides a unified platform to capture, track, and manage cases from initiation to resolution. It includes features such as case creation, classification, assignment, task tracking, collaboration, and closure. This application can be tailored to various uses, such as HR inquiries, legal matters, facilities management, and customer support escalations among others.

Problem management is drawn to identifying and addressing the root causes of recurring incidents or issues. It helps IT teams identify underlying problems that lead to multiple incidents, analyze their impact, and initiate appropriate actions for resolution. The problem management application provides tools for problem identification, investigation, prioritization, and tracking. It allows users to link related incidents, perform root cause analysis, define workarounds or solutions, and track the progress of problem resolution. The application helps groups minimize the occurrence and impact of recurring issues, leading to improved service quality and stability for the platform and other systems.

Field service management facilitates efficient management of field service operations (e.g., equipment installation, repairs, maintenance, and/or troubleshooting) by automating workflows, streamlining task assignment, and improving visibility into field activities. It enables handling of service requests, dispatch of technicians, tracking of physical and software assets, and performance monitoring. Field service management can be integrated with incident management, case management, and/or problem management applications, providing a unified platform for managing both internal and field operations.

Additionally, task-based applications include the assignment of computing tasks to workers in the form of execution infrastructure (e.g., one or more processors, server devices, platforms, or other computing systems). These tasks may be computing jobs that involve execution of an algorithm or application on a set of data. In some cases, the tasks may also involve communication with other computing devices, e.g., to obtain the data or to store the data on an intermediate basis or after it is processed. Tasks may be executed by one or more processes or computing threads executing across the execution infrastructure.

B. Task Schema

A database schema defines the structure and organization of data within a database. It specifies how the data is stored, including the tables, fields within each table, and relationships between tables. The schema outlines the types of data (such as integers, text strings, dates, or references) that are to be stored in the fields. Thus, a schema acts as a blueprint for the database, defining not just the format of data, but also how it can be accessed, manipulated, and related to other data.

In the context of task-based applications, a task is a unit of work (e.g., a work item) that can be assigned to a worker (e.g., a technician or computing thread). A task may have a number of attributes that are automatically determined or manually set. Thus, the attributes of tasks may be stored in one or more database tables according to a schema.

As an example, tasks may be stored in a database according to table 600 of FIG. 6. While the fields of a database table are logically considered to be columns, they are expressed as rows in FIG. 6 for purposes of convenience. Therefore, each entry in table 600 contains data (even if empty or blank) for each field shown. Further, this schema is just one possible embodiment of a definition of a task and depicts some—but not all—possible fields. A brief discussion of some of the more commonly-used fields follows.

Assigned to: The worker or assignment group to which the task is assigned for execution. An assignment group is a number of workers who have certain characteristics in common (the same technical skills, belong to the same organizational department, etc.).

Asset: The physical or virtual asset involved in the task, such as a machine or system in the case of field service management or a computing platform or data in the case of computing task assignment to execution infrastructure.

Created: When the task was created in the task-based application.

Description: A textual specification of relevant information about the task, such as objectives, background, or specific instructions. In some cases, images and/or audio may be included as well.

Location/customer: The physical or virtual location of where the task is to be carried out. A physical location may be specified on terms of a city, address, and/or geographical point(s). A virtual location could be a network address of a remote server accessible by the worker.

Number: A unique identifier for the task (e.g., a 64-bit value that is different from that of all other tasks in the system).

Priority: Tasks are often assigned a priority level, indicating their urgency or importance. High-priority tasks are typically processed before lower-priority ones, especially when worker resources are limited.

Short description: Typically, a brief textual title or specification of the task.

State: Each task may have a lifecycle that follows a workflow with specific states, such as pending, in progress, or completed. Tracking task status is facilitates efficient future task assignment.

Execution time: This refers to how long the task is expected to take. Some tasks are quick and lightweight, while others, like large field repair or data processing jobs, may take considerable time and require advanced scheduling.

Type: The nature of the task, e.g., an incident, case, problem, field service request, or computational task. Computational tasks, for example, could be further subdivided into those that are compute-bound (e.g., number crunching with little input/output), input/output-intensive (e.g., reading/writing large datasets), or interactive (e.g., responding to user inputs).

Work notes: A general field that includes comments made by any individual responsible for completion of the task.

Additionally, computing task assignment to execution infrastructure may involve a number of attributes not explicitly shown in FIG. 6 being associated with tasks. These may include any one or more of the following.

Dependencies and concurrencies: Some tasks depend on the completion of other tasks or external inputs before they can begin. These interdependencies affect task scheduling and execution order. Tasks with no dependencies or limited dependencies with one another may be candidates for being performed concurrently (e.g., in parallel by different workers or sets of workers).

Resource requirements: Each task may need specific amounts of worker resources (e.g., a minimum number of workers). Computational tasks may require a certain amount of processing, memory, storage, or network capacity.

Task switching, pre-task, and post-task overhead: Each task may be associated with overhead relating to switching to or from execution of the task, pre-task activities, and/or post-task activity. For example, a computing task involving a large dataset may require significant computational resources for loading of the dataset for processing from a remote server, movement of the dataset between various levels of the memory hierarchy if the task is interrupted by another task, and/or writing of the processed dataset to the remote server.

These attributes (those appearing in FIG. 6 and others discussed above) are just one possible set of attributes that can be associated with a task. Others may exist.

Computational instance 322 may include a task table in its database to store entries for various types of tasks and workflows within the platform. It may be a parent table from which other specific task-related tables (such as incident, case, problem, field service, etc.) inherit common attributes. This allows for the central management and tracking of tasks across different applications.

VIII. Task Grouping

The embodiments herein involve techniques for intelligent grouping of tasks. This allows tasks that are possibly similar or related to one another to be efficiently handled as a cohesive unit by a single worker (or a small number of workers). Controls on the grouping of tasks (e.g., constraints) allow tasks to be grouped based on policies, such as a minimum or maximum number of tasks per group, task type, degrees of commonality between the tasks, suitability of available workers for the tasks, reduction of various task overhead factors, and so on. Further, task assignment can occur by grouping only unassigned tasks, or grouping unassigned tasks with other existing and/or assigned tasks. Such intelligent groupings reduce computational resources (e.g., processing, memory, network, and energy usage) required for task assignment and execution. Moreover, multiple task assignments can take place in parallel (e.g., for disjoint sets of tasks) in order improve speed and efficiency.

A data model for an implementation of task grouping is shown in FIG. 7A as an entity-relationship diagram and is described below. Each table includes a field name in its left column and the format of that field in its right column (e.g., text, Boolean, integer, reference to an entry in another table, script). This is just one possible data model however, and others could be used. This data model supports configuration of policies, rules, and qualifiers for task grouping. A policy allows definition of rules, qualifiers, and/or other constraints for grouping tasks that are subject to the policy. A rule specifies task filters for selecting tasks to be grouped together. A qualifier constrains the grouping of tasks subject to a given policy to those that match a specified assignment group. The data model of FIG. 7A is just one possible way to define policies, rules, and qualifiers. Other implementations exist.

Table 700 is a task grouping policy table, and each entry in this table defines a policy. Such an entry may provide a name for the policy (e.g., a unique identifier), whether the policy is active, an ordering for the policy, a task type of the policy (e.g., a reference to a specific task table such as incident, case, problem, or field service), constraints (controls) in the form of a minimum and a maximum number of tasks for grouping (a relationship between these numbers may be enforced such that the minimum is never more than the maximum), a list of field names in the task table (e.g., table 600) for purposes of sorting or grouping, a name of a duration field in the task table (e.g., table 600) that identifies the duration of tasks, and the maximum total duration of all tasks in a group (which may be another constraint).

Table 702 is a task grouping rule table, and each entry in this table defines a rule that specifies the tasks to which a policy applies. Each rule in table 702 may be associated with one policy in table 700, but each policy in table 700 may be associated with one or more rules in table 702. Thus, each policy may apply to one or more rules.

An entry in table 702 may include a name for the rule (e.g., a unique identifier), whether the rule is active, a reference to the policy to which the rule applies (e.g., a reference to an entry in table 700), an ordering for the rule, a task filter defining conditions that must be met for a task to be impacted by the rule, a group by list of fields, an advanced flag (when false, the task filter field is used to identify tasks, when true the script field is used to identify tasks), and a script field containing programmatic code executable to identify tasks.

As an example, the task filter field may define a set of true/false conditions that can be combined into a Boolean expression (e.g., with AND, OR, and NOT operators). When the attribute values of a task satisfy such an expression, the task is deemed to match the rule and thus is subject to the policy. For instance, considering the schema set forth in FIG. 6, a task filter field of "task.priority='P1' AND task.state='pending'" can be used to match any task with a P1 priority and in the pending state. Such matching tasks would be subject to the policy to which the rule refers. Alternatively, the group by field may define a list of fields in the task table by which tasks can be grouped (e.g., tasks with the same attribute values for all of these fields may be grouped together). On the other hand, a script could employ more complex programmatic logic to identify tasks, such as pattern matching, contextual filters based on natural language processing, or adaptive filters that change over time.

Table 704 is a task grouping qualifier table. Each qualifier in table 704 may be associated with one policy in table 700, but each policy in table 700 may be associated with one or more qualifiers in table 704. Thus, each policy may apply to one or more qualifiers.

An entry in table 704 may include a name for the qualifier (e.g., a unique identifier), a reference to the policy to which the qualifier applies (e.g., an entry in table 700), and a reference to an assignment group. With this information, a qualifier may constrain the grouping of tasks to only those associated with the same assignment group. In this manner, a qualifier further filters tasks eligible for grouping. Note that assignment groups in table 704 are specified as references to entries in an assignment group table that is not shown in FIG. 7A. For purpose of illustration, the assignment group table may include fields for names, descriptions, managers, email addresses, and types of assignment groups.

Figure 7B:
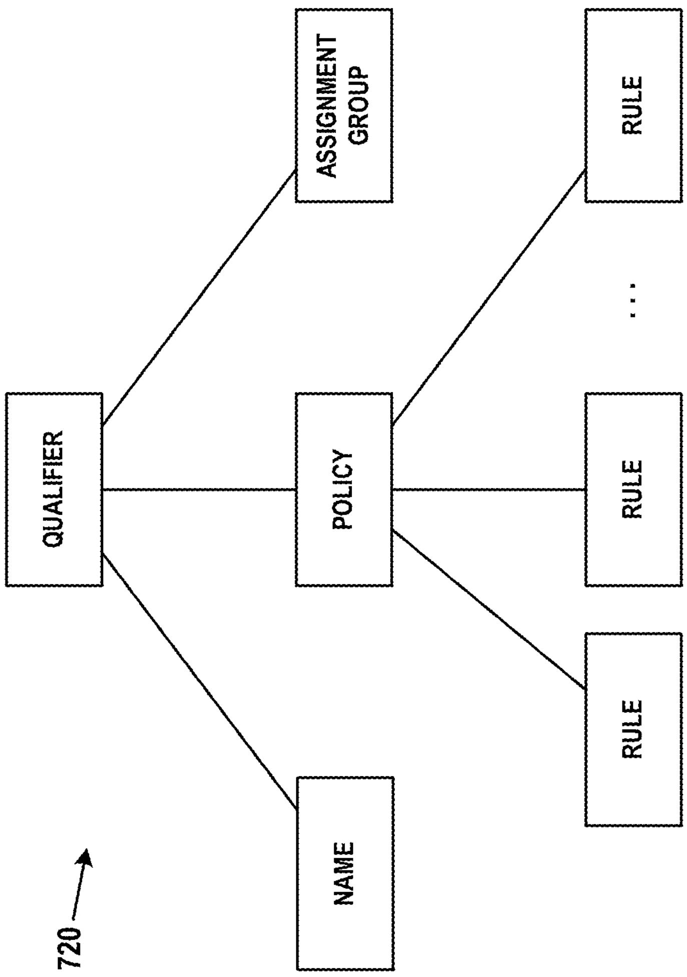
FIG. 7B depicts a logical view of the task grouping data model, in accordance with example embodiments.

FIG. 7B is a simplified depiction 720 of the data model of FIG. 7A. In this simplified depiction, a qualifier is associated with its name, a policy, and an assignment group. The policy may be associated with one or more rules. Though not explicitly depicted in FIG. 7B, table 704 may define multiple qualifiers, each with its own associations in accordance with depiction 720.

The task grouping data model expressed herein, including the number and content of tables, associations between tables, names of fields, and so on, can be arranged in various ways. Therefore, the embodiments set forth in FIGS. 7A and 7B are for purposes of example and other arrangements are possible.

IX. Application-Based Task Bundling

As noted, the task grouping mechanisms defined by FIGS. 7A and 7B may be used with various types of tasks (e.g., incidents, cases, problems, field service requests, or computational tasks). Thus, each of the applications that manage incidents, cases, problems, field service requests, and computational tasks may employ these task grouping mechanisms.

In particularly, these applications may employ application-based task bundling as a further set of application-specific constraints on task grouping. Here, the term "bundling" is used to differentiation from the "grouping" upon which the bundling relies.

Figure 8A:
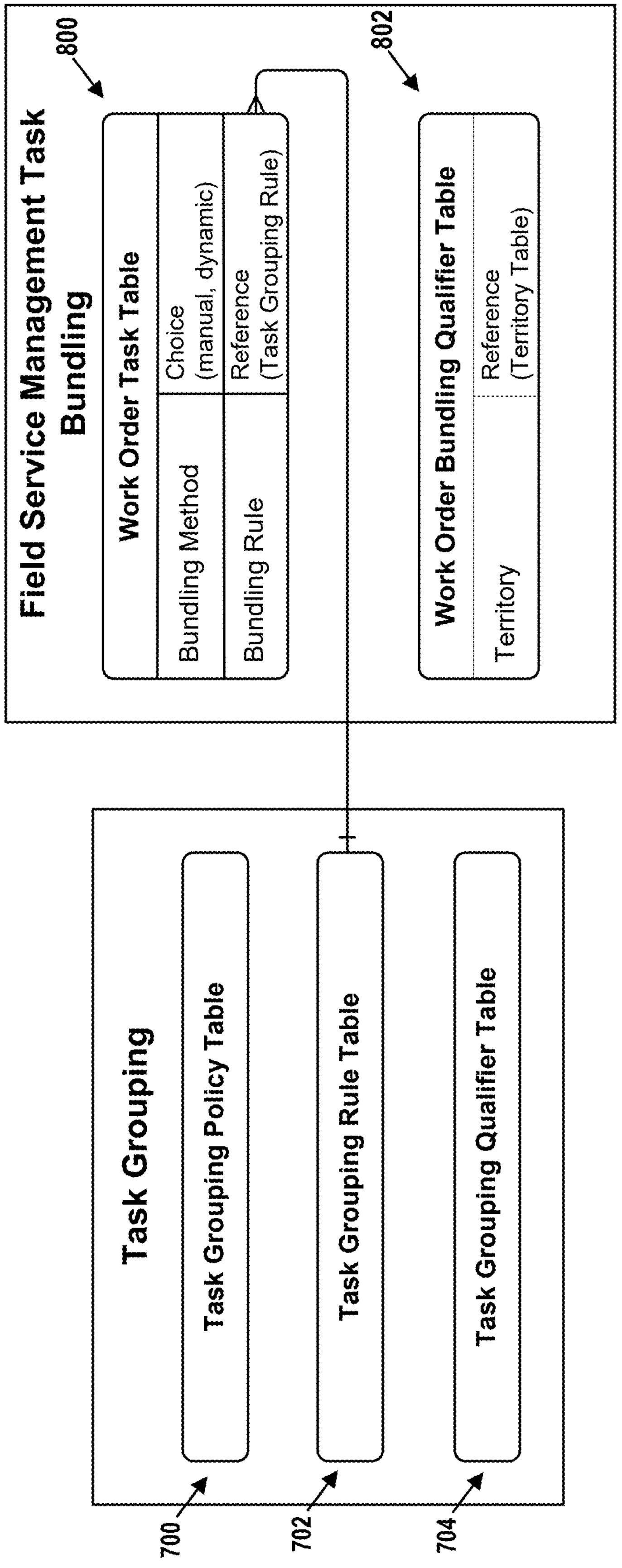
FIGS. 8A and 8B depict further data models of task bundling applications relying in the task grouping data model, in accordance with example embodiments.

As an example, FIG. 8A depicts a data model for field service management task bundling. This data model relies on the task grouping data model discussed above, particularly, tables 700, 702, and 704, as well as the associations between entries in these tables. Notably, FIG. 8A omits details regarding the content of these tables and their associations for purposes of simplicity.

The data model of FIG. 8A also introduces tables 800 and 802. Table 800 is a work order task table with fields of bundling method and bundling rule. The bundling method defines whether the bundling in accordance with the bundling rule is to occur manually (at the explicit request of a user) or dynamically (automatically based on a trigger such a modification to an entry in the database, expiry of a time, etc.). The bundling rule is a reference to an entry in table 702. Thus, entries in table 802 refer to a grouping rule.

Table 802 is a work order bundling qualifier table with a field of territory. The territory refers to an entry in a territory table (not shown in FIG. 8A, but defining a number of geographical territories). Here, a territory may include one or more locations within a particular geographic boundary (e.g., a territory of Northern California may include locations in San Francisco, San Jose, and Oakland). The territory table may include fields for names, descriptions, and geographic coordinates (e.g., latitude and longitude points defining a geographic boundary around the territory and/or a center point of the territory and a radius extending therefrom).

This data model allows further application-specific qualifiers to be applied to rules in the case of field service management tasks. For instance, it may be inefficient to group or bundle tasks from two distinct territories (e.g., one in California, the other in New York), because of the travel overhead between these locations. However, the territory constraint may not be applicable to other types of tasks (e.g., incident, cases, or problems), so therefore it appears only in the bundling data model for this application, rather than the grouping data model of FIG. 7A.

In some cases, further qualifiers may be present, such as indications of machine type for repair, parts needed for the repair, tools needed for the repair, and technician skillset. Such qualifiers are optional but allow more fine-grained management of task bundling.

Figure 8B:
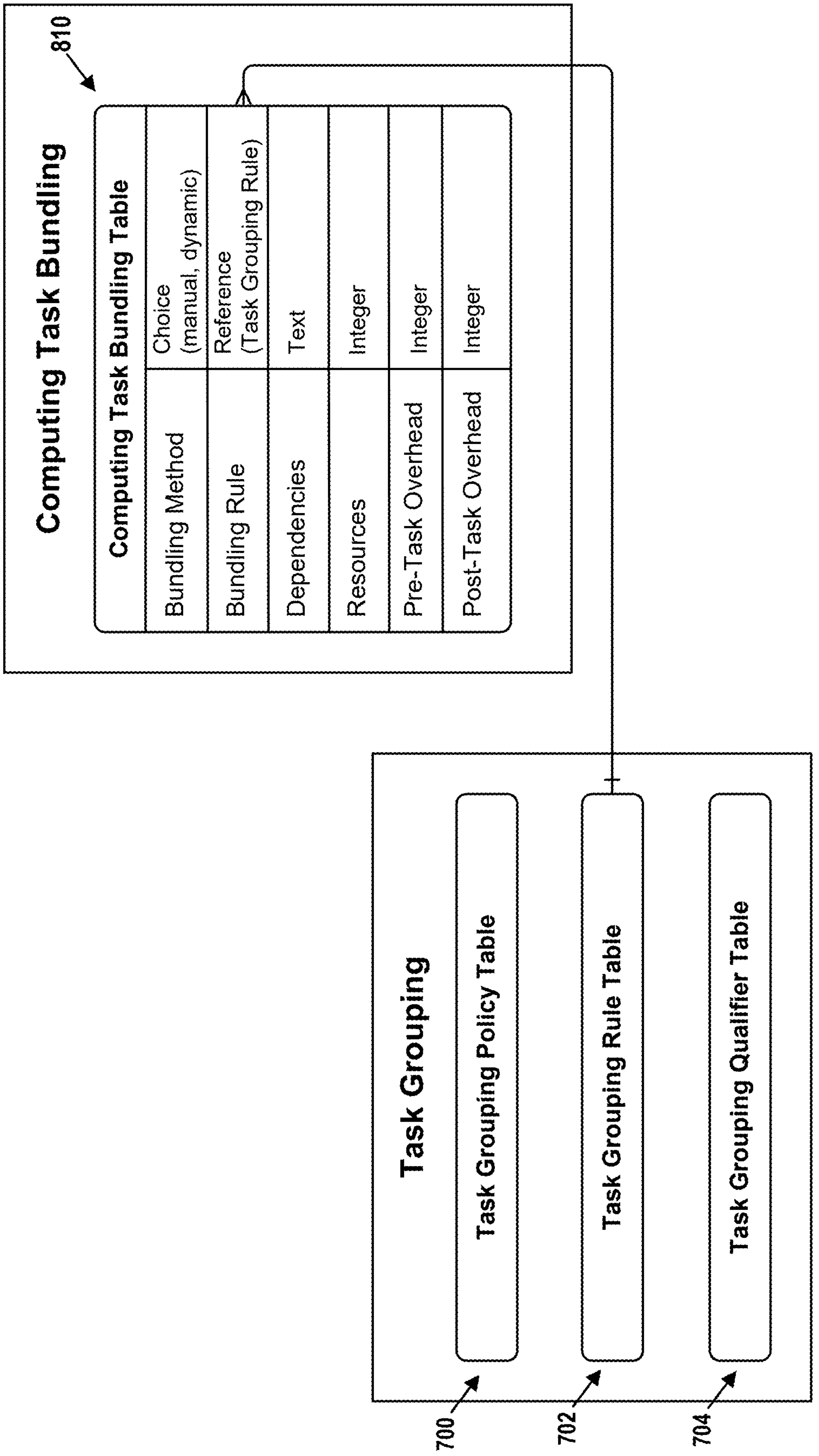

As another example, FIG. 8B depicts a data model for computing task bundling. This data model also relies on the task grouping data model discussed above, particularly, tables 700, 702, and 704, as well as the associations between entries in these tables. As was the case for FIG. 8A, FIG. 8B omits details regarding the content of these tables and their associations for purposes of simplicity.

The data model of FIG. 8B also introduces table 810. Table 810 is a computing task bundling table with fields of bundling method, bundling rule, dependencies, resources, pre-task overhead, and post-task overhead.

The bundling method defines whether the bundling in accordance with the bundling rule is to occur manually (at the explicit request of a user) or dynamically (automatically based on a trigger such a modification to an entry in the database, expiry of a time, etc.). The bundling rule is a reference to an entry in table 702. Thus, entries in table 810 refer to a grouping rule.

Table 810 also includes a list of dependencies, e.g., in text form. This list may include references to other computing tasks that must complete before any of the tasks in this bundle begin, or references to datasets that must be obtained for the computing tasks in the bundle to operate. In some cases, the dependencies field may also be used to specify concurrencies, e.g., other computing tasks that can operate in parallel with this computing task). The resources field specifies the number of workers (e.g., computing threads) required for the computing tasks once bundled. This may be an upper (a maximum number of computing threads) or a lower bound (a minimum number of computing threads), for example. The pre-task overhead and post-task overhead fields specify an approximate amount of time required before the bundled tasks can execute and after the bundled tasks execute (e.g., in seconds). For instance, remotely loading a dataset of several terabytes may require several minutes of overhead before a computing task can operate on this dataset, as well as several minutes to store any changes made to the dataset by the computing task.

This data model allows further application-specific qualifiers to be applied to rules in the case of computing tasks. For instance, it may be inefficient to group or bundle tasks different dependencies or that require different amounts of computing threads.

The task bundling data model expressed herein, including the number and content of tables, associations between tables, names of fields, and so on, can be arranged in various ways. Therefore, the embodiments set forth in FIGS. 8A and 8B are for purposes of example and other arrangements are possible.

Despite the embodiments herein applying to applications other than field service management, the following discussion will focus on the grouping (and bundling) of field service management tasks. Similar examples can be set forth the grouping (and bundling) of computing tasks or other types of tasks.

X. Grouping and Bundling Procedures

The following includes several grouping and bundling techniques that can be employed using task grouping procedures. These include assignment of tasks to new bundles, addition of tasks to existing bundles, and addition of tasks to bundles that are assigned to a worker.

A. Assignment of Tasks to New Bundles

Figure 9:
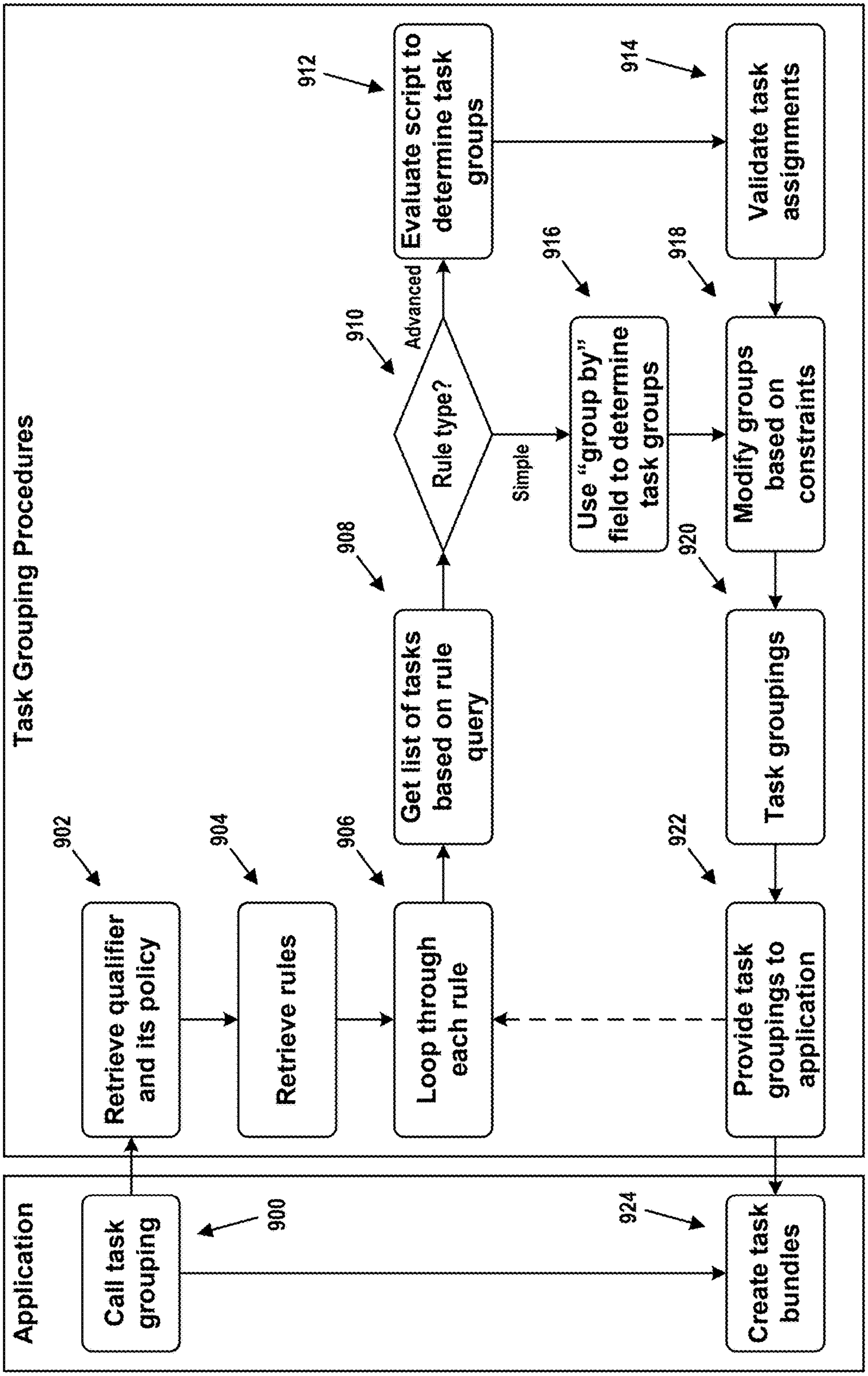
FIG. 9 is a flow chart depicting task grouping on behalf of an application, in accordance with example embodiments.

FIG. 9 is a flow chart depicting task grouping on behalf of an application. Here, the application may be a task-based application that employs task bundling (e.g., field service management, computing task management) and the task grouping may be a shared set of operations that occur in accordance with the discussion of FIGS. 7A and 7B. The task grouping operations are called (and set in motion by) the application.

In FIG. 9, operations performed by the application appear in the box on the left, and include steps 900 and 924. All other operations are task grouping procedures and appear in the box on the right.

At step 900, the application may call the task grouping procedures. To do so, the application may provide a reference to a qualifier and/or its policy. The task grouping procedures determine groupings of tasks that are eventually provided back to the application at step 924. In order to take constraints specific to the application into account (e.g., territory for the field service management application), the application may call the task grouping procedures several times for different subset of tasks to be grouped (e.g., one call per territory).

At step 902, a qualifier and its policy is retrieved. For example, the task grouping procedures may iterate through all of the entries in table 704 and, for each, identify its associated policy entry in table 700. Then the task grouping procedures may be applied to each of the qualifier/policy pairs.

At step 904, the rules for the policy identified in step 902 are retrieved. Doing so may involve querying table 702 for rules that are associated with this policy.

Step 906 indicates that the remaining steps of the task grouping procedures are looped through for each rule. Put another way, this means that the operations from step 906 to step 922 may occur once for each rule. The ordering of this loop may be in accordance with the order field of table 700 (e.g., the tasks higher in the order are processed before tasks lower in the order).

At step 908, a list of tasks is obtained based on the rule query. As noted above, results of the rule query may be reduced based on the conditions set forth in the task filter field (simple) or the result on executing the script referred to or defined by the advanced field. When the simple field is set to a value of true, the task filter is used. When the simple field is set to false, the script is executed.

At step 910, a decision is made based on the rule type. If the rule's simple field is set to a value of false (and thus the rule is advanced), control progresses to step 912. If the rule's simple field is set to a value of true (and thus the rule is simple), control progresses to step 916.

At step 912, it has been determined that the rule is advanced and therefore defined by a script. Accordingly, this script is executed to determine the task groups. The result of this script execution should be that each unassigned task is assigned to exactly one task group. However, since scripts can be user defined, this is not guaranteed to be the case.

At step 914, the task assignments to task groups are validated. This step may attempt to identify and/or correct any situation where a task remains unassigned or some other aspect of the task assignments do not meet a requirement of the rule.

At step 916, it has been determined that the rule is defined by a task filter. In this case, the task groupings are made in accordance to the group by field of table 702, which defines a list of fields (e.g., fields in table 600 in the case of incidents) by which to group the tasks. In other words, tasks with the same attribute values in each of these fields are placed in the same group.

At step 918, the task groupings are modified by the constraints defined by the policy. For instance, the policy may determine that the groupings require a minimum of one task and a maximum of ten tasks (per the minimum records and maximum records fields of table 700) but the total duration of tasks per group cannot exceed 8 hours (per the maximum duration field of table 700). For any task groups with more than ten tasks or a total duration of more than 8 hours, a scheduling algorithm can be applied to divide those groups.

This problem is analogous to that of bin-packing (a combinatorial optimization problem where the objective is to pack a set of items with varying sizes into a finite number of bins, each with a fixed capacity, in such a way that the number of bins used is minimized). A number of scheduling algorithms can be used to provide a solution, including first fit (place each task in a group that has enough remaining space, but if no group has enough space, add a new group), best fit (place each task in a group that has the least remaining space that can fit the task, but if no group has enough space, add a new group), first fit decreasing (sort the tasks in decreasing order of duration, then apply the first fit algorithm), and so on.

At step 920, the task groupings for this rule and the policy have been achieved. They may be placed into a structured format, such as a JSON or XML string.

At step 922, the task groupings are provided to the application. As noted above, this is the result of the application calling the task grouping procedures at step 900.

At step 924, task bundles are created by the application. These task bundles may take into account further constraints that are specific to the application.

B. Addition of Tasks to Existing Bundles

In some cases, after tasks have been grouped and bundled, new tasks arrive. These tasks are initially not in any group. Rather than waiting for the next task grouping operation for the application, which may be several hours or days in the future, it may be advantageous to determine whether these tasks can be added to an existing bundle of tasks. In general, it is assumed that the existing bundles being considered have not yet been assigned to a worker. Thus, the grouping can proceed based on the defined policies, rules, and qualifiers.

For a given new task, each existing bundle may be checked to determine whether the task can be grouped in accordance with the bundle without violating any of its constraints. This determination can be made based on the content of tables 700, 702, and 704. For instance, if the new task (i) matches the task filter or script output, and (ii) adding the new task to the bundle would not exceed the bundle's maximum number of tasks or maximum task duration, then the task can be added to the bundle. If the task cannot be added to an existing bundle, it can be grouped during the next task grouping operation for the application and then bundled.

C. Addition of Tasks to Assigned Bundles

Similarly, it may be advantageous to determine whether a new tasks can be added to an existing bundle of tasks that has been assigned to a worker. Doing so generally results in the worker being utilized more efficiently. In this case, the grouping can proceed based on the defined policies, rules, and qualifiers, as well as further constraints of the worker.

For example, suppose that a worker has been assigned a bundle of tasks. Even if the new task can be added to this bundle (e.g., by matching the rule and not violating the constraints of the policy), the constrains of the worker might include (at least in the case of field service management) whether the worker's skill set is sufficient to handle the task, whether the task requires tools and/or parts to which the worker has access, and whether the total task duration exceeds that of the worker (i.e., some workers may have total task durations less than that of the bundling policy). If the task cannot be added to a worker's assigned bundle, it can be considered for addition to existing unassigned bundles or it can be grouped during the next task grouping operation for the application and then bundled.

XI. Example Operations

Figure 10:
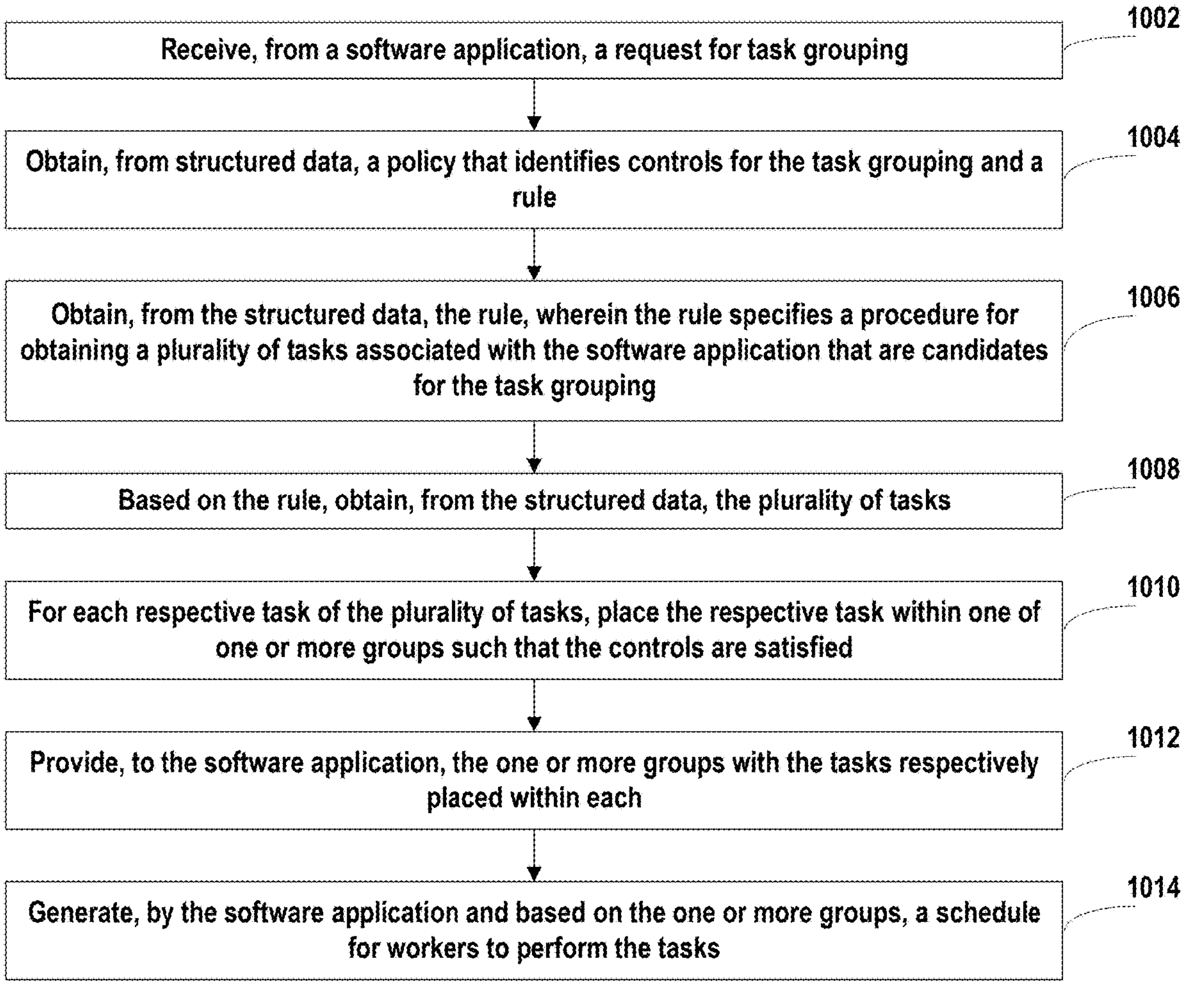
FIG. 10 is a flow chart, in accordance with example embodiments.

FIG. 10 is a flow chart illustrating an example embodiment. The process illustrated by FIG. 10 may be carried out by a computing device, such as computing device 100, and/or a cluster of computing devices, such as server cluster 200. However, the process can be carried out by other types of devices or device subsystems. For example, the process could be carried out by a computational instance of a remote network management platform or a portable computer, such as a laptop or a tablet device.

The embodiments of FIG. 10 may be simplified by the removal of any one or more of the features shown therein. Further, these embodiments may be combined with features, aspects, and/or implementations of any of the previous figures or otherwise described herein.

Block 1002 may involve receiving, from a software application, a request for task grouping.

Block 1004 may involve obtaining, from structured data, a policy that identifies controls for the task grouping and a rule. Here, separating policies from their associated tasks provides a technical solution to a technical problem. It allows sets of tasks to be subject to specific policies in a way that does not require encoding the policy into each task or the rules by which tasks are grouped. Thus, memory is preserved.

Block 1006 may involve obtaining, from the structured data, the rule, wherein the rule specifies a procedure for obtaining a plurality of tasks associated with the software application that are candidates for the task grouping.

Block 1008 may involve, based on the rule, obtaining, from the structured data, the plurality of tasks.

Block 1010 may involve, for each respective task of the plurality of tasks, placing the respective task within one of one or more groups such that the controls are satisfied. Here, an initial set of task groupings can be determined, and then at least some of these groups may be divided based on the controls (e.g., constraints). Doing so simplifies the task assignment problem, saving computing resources such as processing capacity.

Block 1012 may involve providing, to the software application, the one or more groups with the tasks respectively placed within each.

Block 1014 may involve generating, by the software application and based on the one or more groups, a schedule for workers to perform the tasks.

In some embodiments, the structured data comprises a database, wherein the policy is disposed within a policies table of the database, wherein the rule is disposed within a rules table of the database, and wherein the tasks are disposed within a tasks table of the database.

In some embodiments, placing the respective task within one of the one or more groups is based on attribute values of the respective task.

In some embodiments, placing the respective task within one of the one or more groups is based on applying a Boolean, logical, or arithmetic expression to the attribute values of the respective task.

In some embodiments, placing the respective task within one of the one or more groups comprises executing a script that determines the one or more groups based the attribute values of the respective task.

Some embodiments may further involve: determining, based on the controls, that a group of the one or more groups contains more than a predetermined threshold number of tasks; and splitting the group into two or more groups.

Some embodiments may further involve: determining, based on the controls, that a group of the one or more groups contains tasks with a total duration of more than a predetermined threshold duration; and splitting the group into two or more groups.

In some embodiments, the policy also identifies a second rule. These embodiments may involve: obtaining, from the structured data, the second rule, wherein the second rule specifies a second procedure for obtaining a second plurality of further tasks associated with the software application that are candidates for the task grouping; based on the second rule, obtaining, from the structured data, the second plurality of further tasks; for each respective task of the second plurality of further tasks, placing the respective task within a further one of one or more further groups such that the controls are satisfied; and providing, to the software application, the one or more further groups with the further tasks respectively placed within each.

Some embodiments may further involve assigning, to the workers, the one or more groups of the tasks in accordance with the schedule.

In some embodiments, the tasks are computing tasks and the workers are execution infrastructure, wherein the software application is a computing task bundling application that groups computing tasks to be performed by the execution infrastructure, and wherein placing the respective task within one of the one or more groups is also based on pre-task overhead or post-task overhead.

In some embodiments, the tasks are field service tasks, wherein the software application is a field service management application, and wherein placing the respective task within one of the one or more groups is also based on geographical locations associated with the respective task and one or more of the workers.

In some embodiments, obtaining the policy is based on a qualifier that identifies the policy and an assignment group of the workers that are to perform the tasks.

In some embodiments, the one or more groups comprise a plurality of groups, and wherein generating the schedule for the workers to perform the tasks is performed in parallel for each of the plurality of group occurs in parallel.

XII. Closing

The present disclosure is not to be limited in terms of the particular embodiments described in this application, which are intended as illustrations of various aspects. Many modifications and variations can be made without departing from its scope, as will be apparent to those skilled in the art. Functionally equivalent methods and apparatuses within the scope of the disclosure, in addition to those described herein, will be apparent to those skilled in the art from the foregoing descriptions. Such modifications and variations are intended to fall within the scope of the appended claims.

The above detailed description describes various features and operations of the disclosed systems, devices, and methods with reference to the accompanying figures. The example embodiments described herein and in the figures are not meant to be limiting. Other embodiments can be utilized, and other changes can be made, without departing from the scope of the subject matter presented herein. It will be readily understood that the aspects of the present disclosure, as generally described herein, and illustrated in the figures, can be arranged, substituted, combined, separated, and designed in a wide variety of different configurations.

With respect to any or all of the message flow diagrams, scenarios, and flow charts in the figures and as discussed herein, each step, block, and/or communication can represent a processing of information and/or a transmission of information in accordance with example embodiments. Alternative embodiments are included within the scope of these example embodiments. In these alternative embodiments, for example, operations described as steps, blocks, transmissions, communications, requests, responses, and/or messages can be executed out of order from that shown or discussed, including substantially concurrently or in reverse order, depending on the functionality involved. Further, more or fewer blocks and/or operations can be used with any of the message flow diagrams, scenarios, and flow charts discussed herein, and these message flow diagrams, scenarios, and flow charts can be combined with one another, in part or in whole.

A step or block that represents a processing of information can correspond to circuitry that can be configured to perform the specific logical functions of a herein-described method or technique. Alternatively or additionally, a step or block that represents a processing of information can correspond to a module, a segment, or a portion of program code (including related data). The program code can include one or more instructions executable by a processor for implementing specific logical operations or actions in the method or technique. The program code and/or related data can be stored on any type of non-transitory computer readable medium such as a storage device including RAM, ROM, a disk drive, a solid-state drive, or another tangible storage medium.

Moreover, a step or block that represents one or more information transmissions can correspond to information transmissions between software and/or hardware modules in the same physical device. However, other information transmissions can be between software modules and/or hardware modules in different physical devices.

The particular arrangements shown in the figures should not be viewed as limiting. It should be understood that other embodiments could include more or less of each element shown in a given figure. Further, some of the illustrated elements can be combined or omitted. Yet further, an example embodiment can include elements that are not illustrated in the figures.

While various aspects and embodiments have been disclosed herein, other aspects and embodiments will be apparent to those skilled in the art. The various aspects and embodiments disclosed herein are for purpose of illustration and are not intended to be limiting, with the true scope being indicated by the following claims.

What is claimed is:

1. A method comprising:

receiving, from a software application, a request for task grouping, wherein the software application is a computing task bundling application that groups computing tasks to be performed by execution infrastructure;

obtaining, from structured data, a policy that identifies controls for the task grouping and a rule;

obtaining, from the structured data, the rule, wherein the rule specifies a procedure for obtaining a plurality of tasks associated with the software application that are candidates for the task grouping, wherein the rule further specifies, for each respective task of the plurality of tasks, a respective number of computing threads used by the respective task;

based on the rule, obtaining, from the structured data, the plurality of tasks, wherein the plurality of tasks is a plurality of computing tasks;

for each respective task of the plurality of tasks, placing the respective task within one of one or more groups, wherein placing the respective task within one of the one or more groups is based on pre-task overhead or post-task overhead, and wherein placing the respective task within one of the one or more groups comprises placing the respective task into a group with other tasks that use an identical number of computing threads;

for each respective group of the one or more groups, modifying the respective group such that the respective group satisfies the controls for the task grouping, wherein modifying the respective group involves:

making a determination, based on the controls, that the respective group contains more than a predetermined threshold number of tasks or that the respective group contains tasks with a total duration of more than a predetermined threshold duration, and in response to making the determination, splitting the respective group into two or more groups;

providing, to the software application, the one or more groups with the tasks respectively placed within each; and generating, by the software application and based on the one or more groups, a schedule for performing the tasks.

2. The method of claim 1, wherein the structured data comprises a database, wherein the policy is disposed within a policies table of the database, wherein the rule is disposed within a rules table of the database, and wherein the tasks are disposed within a tasks table of the database.

3. The method of claim 1, wherein placing the respective task within one of the one or more groups is based on attribute values of the respective task.

4. The method of claim 3, wherein placing the respective task within one of the one or more groups is based on applying a Boolean, logical, or arithmetic expression to the attribute values of the respective task.

5. The method of claim 3, wherein placing the respective task within one of the one or more groups comprises executing a script that determines the one or more groups based on the attribute values of the respective task.

6. The method of claim 1, wherein the policy also identifies a second rule, the method further comprising:

obtaining, from the structured data, the second rule, wherein the second rule specifies a second procedure for obtaining a second plurality of further tasks associated with the software application that are candidates for the task grouping;

based on the second rule, obtaining, from the structured data, the second plurality of further tasks;

for each respective task of the second plurality of further tasks, placing the respective task within a further one of one or more further groups such that the controls are satisfied; and providing, to the software application, the one or more further groups with the further tasks respectively placed within each.

7. The method of claim 1, further comprising:

assigning the one or more groups of the tasks in accordance with the schedule.

8. The method of claim 1, wherein obtaining the policy is based on a qualifier that identifies the policy and an assignment group that is to perform the tasks.

9. The method of claim 1, wherein the one or more groups comprise a plurality of groups, and wherein generating the schedule for performing the tasks is performed in parallel for each of the plurality of groups.

10. The method of claim 1, wherein placing each respective task of the plurality of tasks within one of one or more groups is performed in parallel for disjoint sets of the tasks.

11. A non-transitory computer-readable medium, having stored thereon program instructions that, upon execution by a computing system, cause the computing system to perform operations comprising:

receiving, from a software application, a request for task grouping, wherein the software application is a computing task bundling application that groups computing tasks to be performed by execution infrastructure;

obtaining, from structured data, a policy that identifies controls for the task grouping and a rule;

obtaining, from the structured data, the rule, wherein the rule specifies a procedure for obtaining a plurality of tasks associated with the software application that are candidates for the task grouping, wherein the rule further specifies, for each respective task of the plurality of tasks, a respective number of computing threads used by the respective task;

based on the rule, obtaining, from the structured data, the plurality of tasks, wherein the plurality of tasks is a plurality of computing tasks;

for each respective task of the plurality of tasks, placing the respective task within one of one or more groups, wherein placing the respective task within one of the one or more groups is based on pre-task overhead or post-task overhead, and wherein placing the respective task within one of one or more groups comprises placing the respective task into a group with other tasks that use an identical number of computing threads;

for each respective group of the one or more groups, modifying the respective group such that the respective group satisfies the controls for the task grouping, wherein modifying the respective group involves:

making a determination, based on the controls, that the respective group contains more than a predetermined threshold number of tasks or that the respective group contains tasks with a total duration of more than a predetermined threshold duration, and in response to making the determination, splitting the respective group into two or more groups;

providing, to the software application, the one or more groups with the tasks respectively placed within each; and generating, by the software application and based on the one or more groups, a schedule for performing the tasks.

12. The non-transitory computer-readable medium of claim 11, the operations further comprising:

assigning the one or more groups of the tasks in accordance with the schedule.

13. The non-transitory computer-readable medium of claim 11, wherein the policy also identifies a second rule, the operations further comprising:

obtaining, from the structured data, the second rule, wherein the second rule specifies a second procedure for obtaining a second plurality of further tasks associated with the software application that are candidates for the task grouping;

based on the second rule, obtaining, from the structured data, the second plurality of further tasks;

for each respective task of the second plurality of further tasks, placing the respective task within a further one of one or more further groups such that the controls are satisfied; and providing, to the software application, the one or more further groups with the further tasks respectively placed within each.

14. The non-transitory computer-readable medium of claim 11, wherein the one or more groups comprise a plurality of groups, and wherein generating the schedule for performing the tasks is performed in parallel for each of the plurality of groups.

15. The non-transitory computer-readable medium of claim 11, wherein placing each respective task of the plurality of tasks within one of one or more groups is performed in parallel for disjoint sets of the tasks.

16. A system comprising:

one or more processors; and memory, containing program instructions that, upon execution by the one or more processors, cause the system to perform operations comprising:

receiving, from a software application, a request for task grouping, wherein the software application is a computing task bundling application that groups computing tasks to be performed by execution infrastructure;

obtaining, from structured data, a policy that identifies controls for the task grouping and a rule;

obtaining, from the structured data, the rule, wherein the rule specifies a procedure for obtaining a plurality of tasks associated with the software application that are candidates for the task grouping, wherein the rule further specifies, for each respective task of the plurality of tasks, a respective number of computing threads used by the respective task;

based on the rule, obtaining, from the structured data, the plurality of tasks, wherein the plurality of tasks is a plurality of computing tasks;

for each respective task of the plurality of tasks, placing the respective task within one of one or more groups, wherein placing the respective task within one of the one or more groups is based on pre-task overhead or post-task overhead, and wherein placing the respective task within one of one or more groups comprises placing the respective task into a group with other tasks that use an identical number of computing threads;

for each respective group of the one or more groups, modifying the respective group such that the respective group satisfies the controls for the task grouping, wherein modifying the respective group involves:

making a determination, based on the controls, that the respective group contains more than a predetermined threshold number of tasks or that the respective group contains tasks with a total duration of more than a predetermined threshold duration, and in response to making the determination, splitting the respective group into two or more groups;

providing, to the software application, the one or more groups with the tasks respectively placed within each; and generating, by the software application and based on the one or more groups, a schedule for performing the tasks.

17. The system of claim 16, the operations further comprising:

assigning the one or more groups of the tasks in accordance with the schedule.

18. The system of claim 16, wherein the policy also identifies a second rule, the operations further comprising:

obtaining, from the structured data, the second rule, wherein the second rule specifies a second procedure for obtaining a second plurality of further tasks associated with the software application that are candidates for the task grouping;

based on the second rule, obtaining, from the structured data, the second plurality of further tasks;

for each respective task of the second plurality of further tasks, placing the respective task within a further one of one or more further groups such that the controls are satisfied; and providing, to the software application, the one or more further groups with the further tasks respectively placed within each.

19. The system of claim 16, wherein placing each respective task of the plurality of tasks within one of one or more groups is performed in parallel for disjoint sets of the tasks.

* * * * *